(12) United States Patent
Grubac et al.

(10) Patent No.: US 12,590,520 B1
(45) Date of Patent: Mar. 31, 2026

(54) MAXIMIZING STIMULATION EFFICIENCY AND CONTACT AREA FOR HEAT HARVESTING

(71) Applicant: MAZAMA ENERGY, INC., Seattle, WA (US)

(72) Inventors: Gabrijel Grubac, Zrenjanin (RS); Abdel Wadood Mohamed El-Rabaa, Plano, TX (US); Sriram Vasantharajan, Plano, TX (US)

(73) Assignee: MAZAMA ENERGY, INC., Frisco, TX (US)

( * ) Notice: Subject to any disclaimer, the term of this patent is extended or adjusted under 35 U.S.C. 154(b) by 0 days.

(21) Appl. No.: 19/287,010

(22) Filed: Jul. 31, 2025

(51) Int. Cl.
| | |
|---|---|
| *G06F 11/30* | (2006.01) |
| *E21B 43/17* | (2006.01) |
| *E21B 49/00* | (2006.01) |
| *F03G 4/00* | (2006.01) |

(52) U.S. Cl.
CPC ............ *E21B 43/17* (2013.01); *E21B 49/008* (2013.01); *E21B 2200/20* (2020.05); *F03G 4/072* (2021.08)

(58) Field of Classification Search
CPC ...................................................... E21B 43/17
See application file for complete search history.

(56) References Cited

U.S. PATENT DOCUMENTS

| | | |
|---|---|---|
| 2,970,645 A | 2/1961 | Glass |
| 3,270,816 A | 9/1966 | Staadt |

| | | |
|---|---|---|
| 3,817,038 A | 6/1974 | Paull et al. |
| 4,200,152 A | 4/1980 | Foster |
| 4,896,362 A | 1/1990 | Parker |

(Continued)

FOREIGN PATENT DOCUMENTS

| | | |
|---|---|---|
| DE | 102008009499 A1 | 8/2009 |
| EP | 3575547 A2 | 4/2019 |

(Continued)

OTHER PUBLICATIONS

U.S. Dept. of Energy, "*What is an Enhanced Geothermal System (EGS)?*", DOE/EE-0785, Sep. 2012.

(Continued)

*Primary Examiner* — Phuong Huynh
(74) *Attorney, Agent, or Firm* — The Wendt Firm, P.C.; Jeffrey L. Wendt

(57) ABSTRACT

Systems and processes for assessing connectivity between subterranean injector and producer wells. One process includes assessing pressure analytics before, during or after injection of stimulation fluid into a well. Pressure communication analytics includes analysis of pressure inflection at selected downhole locations and measuring one or more of: time to a first pressure inflection of a test fluid at the selected downhole locations; volume of test fluid pumped during time to first pressure inflection at the selected downhole locations; differential of pressure at the selected downhole locations from moment of the first pressure inflection to end of injection of test fluid in a well; pressure derivative at the selected downhole locations during entire time of injection of test fluid into the well; and pressure response at selected downhole locations at and post shut-in of injection of the test fluid, and composing a connectivity matrix which classifies observed pressure.

13 Claims, 21 Drawing Sheets

Pressure Inflection Analysis

(56) References Cited

U.S. PATENT DOCUMENTS

| | | | |
|---|---|---|---|
| 4,974,675 | A | 12/1990 | Austin et al. |
| 5,482,116 | A | 1/1996 | El-Rabaa et al. |
| 5,685,362 | A | 11/1997 | Brown |
| 6,543,538 | B2 | 4/2003 | Tolman et al. |
| 7,331,385 | B2 | 2/2008 | Symington et al. |
| 7,631,691 | B2 | 12/2009 | Symington et al. |
| 8,201,626 | B2 | 6/2012 | Balczewski |
| 8,540,020 | B2 | 9/2013 | Stone et al. |
| 8,863,839 | B2 | 10/2014 | Kaminsky et al. |
| 9,074,794 | B2 | 7/2015 | Suryanarayana et al. |
| 9,080,441 | B2 | 7/2015 | Meurer et al. |
| 9,284,819 | B2 | 3/2016 | Tolman et al. |
| 9,322,239 | B2 | 4/2016 | Boza et al. |
| 9,328,600 | B2 | 5/2016 | Kaminsky et al. |
| 9,703,904 | B2 | 7/2017 | Suryanarayana et al. |
| 9,726,157 | B2 | 8/2017 | Sweatman et al. |
| 9,945,218 | B2 | 4/2018 | Tolman et al. |
| 9,963,955 | B2 | 5/2018 | Tolman et al. |
| 10,140,393 | B2 | 11/2018 | Hoda et al. |
| 11,125,472 | B2 | 9/2021 | Toews et al. |
| 11,162,346 | B2 | 11/2021 | Montalvo et al. |
| 11,460,008 | B2 | 10/2022 | Toews et al. |
| 11,697,759 | B1 | 7/2023 | Dusterhoft |
| 11,808,121 | B2 | 11/2023 | Norbeck et al. |
| 11,927,369 | B2 | 3/2024 | Norbeck et al. |
| 12,247,470 | B1 | 3/2025 | Alcantar et al. |
| 12,281,550 | B2 | 4/2025 | Norbeck et al. |
| 12,297,724 | B1 | 5/2025 | Latimer et al. |
| 12,305,893 | B1 | 5/2025 | Alcantar et al. |
| 2004/0206085 | A1 | 10/2004 | Koenig et al. |
| 2006/0157243 | A1 | 7/2006 | Nguyen |
| 2007/0107901 | A1 | 5/2007 | Maguire |
| 2010/0078169 | A1 | 4/2010 | Symington et al. |
| 2010/0282460 | A1 | 11/2010 | Stone et al. |
| 2010/0307756 | A1 | 12/2010 | Jung et al. |
| 2011/0146982 | A1 | 6/2011 | Kaminsky et al. |
| 2012/0312545 | A1 | 12/2012 | Suryanarayana et al. |
| 2013/0062055 | A1 | 3/2013 | Tolman et al. |
| 2013/0068469 | A1 | 3/2013 | Lin et al. |
| 2013/0112403 | A1* | 5/2013 | Meurer ................ E21B 43/267 166/248 |
| 2013/0220604 | A1 | 8/2013 | El-Rabaa et al. |
| 2013/0306315 | A1 | 11/2013 | Kaminsky et al. |
| 2014/0008073 | A1* | 1/2014 | Rey-Bethbeder ....... E21B 36/04 166/308.1 |
| 2015/0167441 | A1 | 6/2015 | Howell et al. |
| 2015/0247372 | A1 | 9/2015 | Boza et al. |
| 2015/0315890 | A1 | 11/2015 | Tolman et al. |
| 2015/0369521 | A1 | 12/2015 | Buscheck |
| 2016/0102528 | A1 | 4/2016 | Wise |
| 2016/0168962 | A1 | 6/2016 | Tolman et al. |
| 2016/0169212 | A1 | 6/2016 | Hine |
| 2017/0175505 | A1 | 6/2017 | Curlett |
| 2019/0154010 | A1 | 5/2019 | Toews |
| 2019/0346181 | A1 | 11/2019 | Toews |
| 2020/0173692 | A1 | 6/2020 | Buscheck et al. |
| 2020/0191444 | A1 | 6/2020 | Nevison et al. |
| 2020/0217181 | A1 | 7/2020 | Norbeck et al. |
| 2021/0231109 | A1 | 7/2021 | Toews et al. |
| 2023/0097426 | A1* | 3/2023 | Sun .......................... G06N 7/01 706/11 |
| 2023/0114197 | A1 | 4/2023 | Hughes |

FOREIGN PATENT DOCUMENTS

| | | |
|---|---|---|
| WO | WO2019095032 A1 | 5/2019 |
| WO | WO2019213735 A1 | 11/2019 |
| WO | WO2021146791 A1 | 7/2021 |
| WO | WO2022061320 A1 | 3/2022 |
| WO | WO2022155743 A1 | 7/2022 |
| WO | WO2024028646 A1 | 2/2024 |
| WO | WO2025041108 A1 | 2/2025 |
| WO | WO2025046518 A1 | 3/2025 |

OTHER PUBLICATIONS

Muir, *"New Opportunities and Applications for Closed-Loop Geothermal Energy Systems"*, Geothermal Rising Bulletin, Dec. 2020, vol. 49, No. 4.

Erkan, K. et al., "Understanding the Chena Hot Springs, Alaska", *Geothermics* 37 (2008) 565-585.

Leuchenberg et al., "Development and Performance of Surface Equipment for High Temperature Underbalanced Drilling in Sour, Severely Under Pressured Formation", Mobil Oil (2004) pp. 1-10.

* cited by examiner

Figure 9:
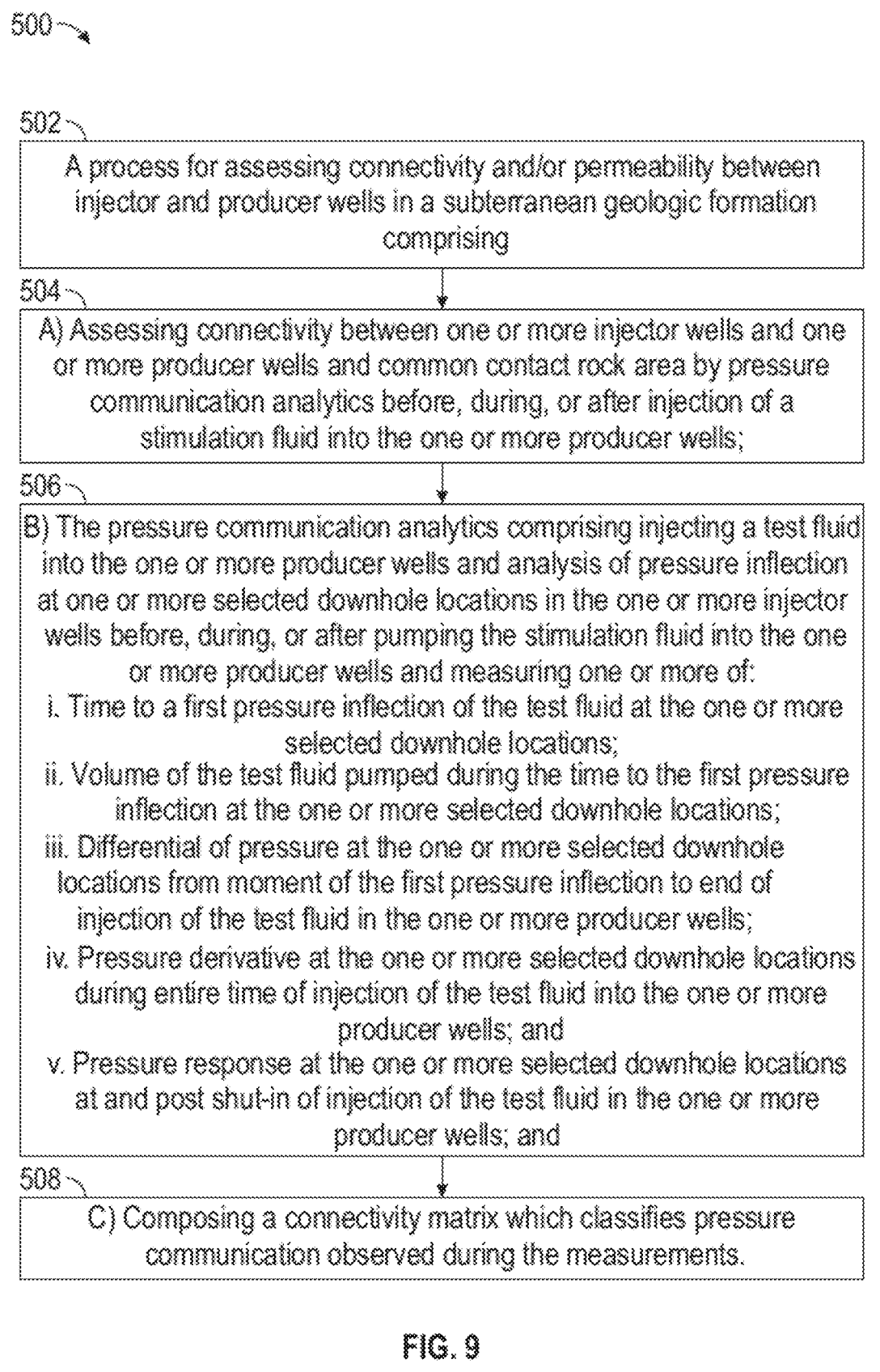

500 —

502 —

A process for assessing connectivity and/or permeability between injector and producer wells in a subterranean geologic formation comprising

504 —

A) Assessing connectivity between one or more injector wells and one or more producer wells and common contact rock area by pressure communication analytics before, during, or after injection of a stimulation fluid into the one or more producer wells;

506 —

B) The pressure communication analytics comprising injecting a test fluid into the one or more producer wells and analysis of pressure inflection at one or more selected downhole locations in the one or more injector wells before, during, or after pumping the stimulation fluid into the one or more producer wells and measuring one or more of:
i. Time to a first pressure inflection of the test fluid at the one or more selected downhole locations;
ii. Volume of the test fluid pumped during the time to the first pressure inflection at the one or more selected downhole locations;
iii. Differential of pressure at the one or more selected downhole locations from moment of the first pressure inflection to end of injection of the test fluid in the one or more producer wells;
iv. Pressure derivative at the one or more selected downhole locations during entire time of injection of the test fluid into the one or more producer wells; and
v. Pressure response at the one or more selected downhole locations at and post shut-in of injection of the test fluid in the one or more producer wells; and

508 —

C) Composing a connectivity matrix which classifies pressure communication observed during the measurements.

Figure 10:
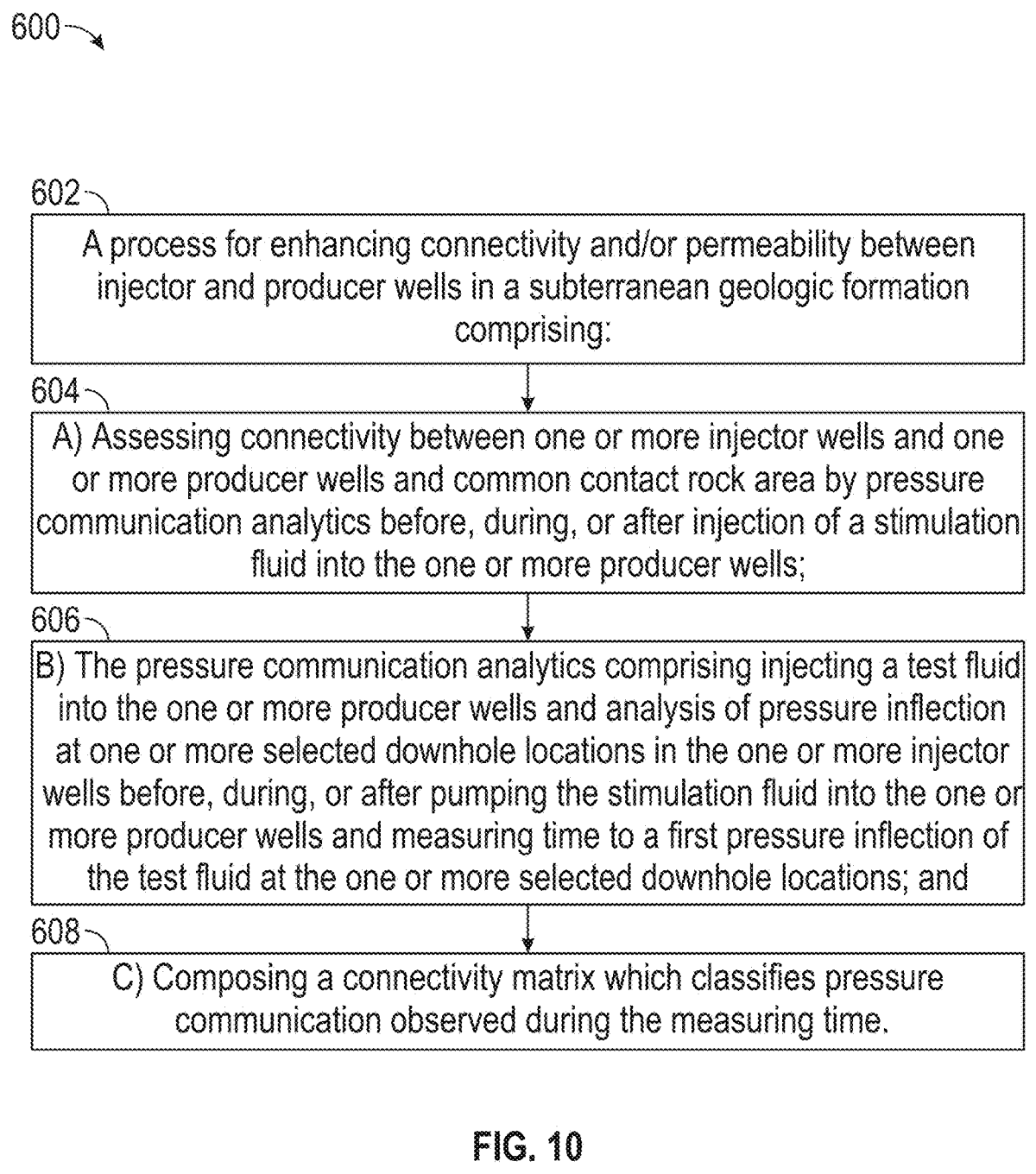

A process for enhancing connectivity and/or permeability between injector and producer wells in a subterranean geologic formation comprising:

604

A) Assessing connectivity between one or more injector wells and one or more producer wells and common contact rock area by pressure communication analytics before, during, or after injection of a stimulation fluid into the one or more producer wells;

606

B) The pressure communication analytics comprising injecting a test fluid into the one or more producer wells and analysis of pressure inflection at one or more selected downhole locations in the one or more injector wells before, during, or after pumping the stimulation fluid into the one or more producer wells and measuring time to a first pressure inflection of the test fluid at the one or more selected downhole locations; and

608

C) Composing a connectivity matrix which classifies pressure communication observed during the measuring time.

Figure 11:
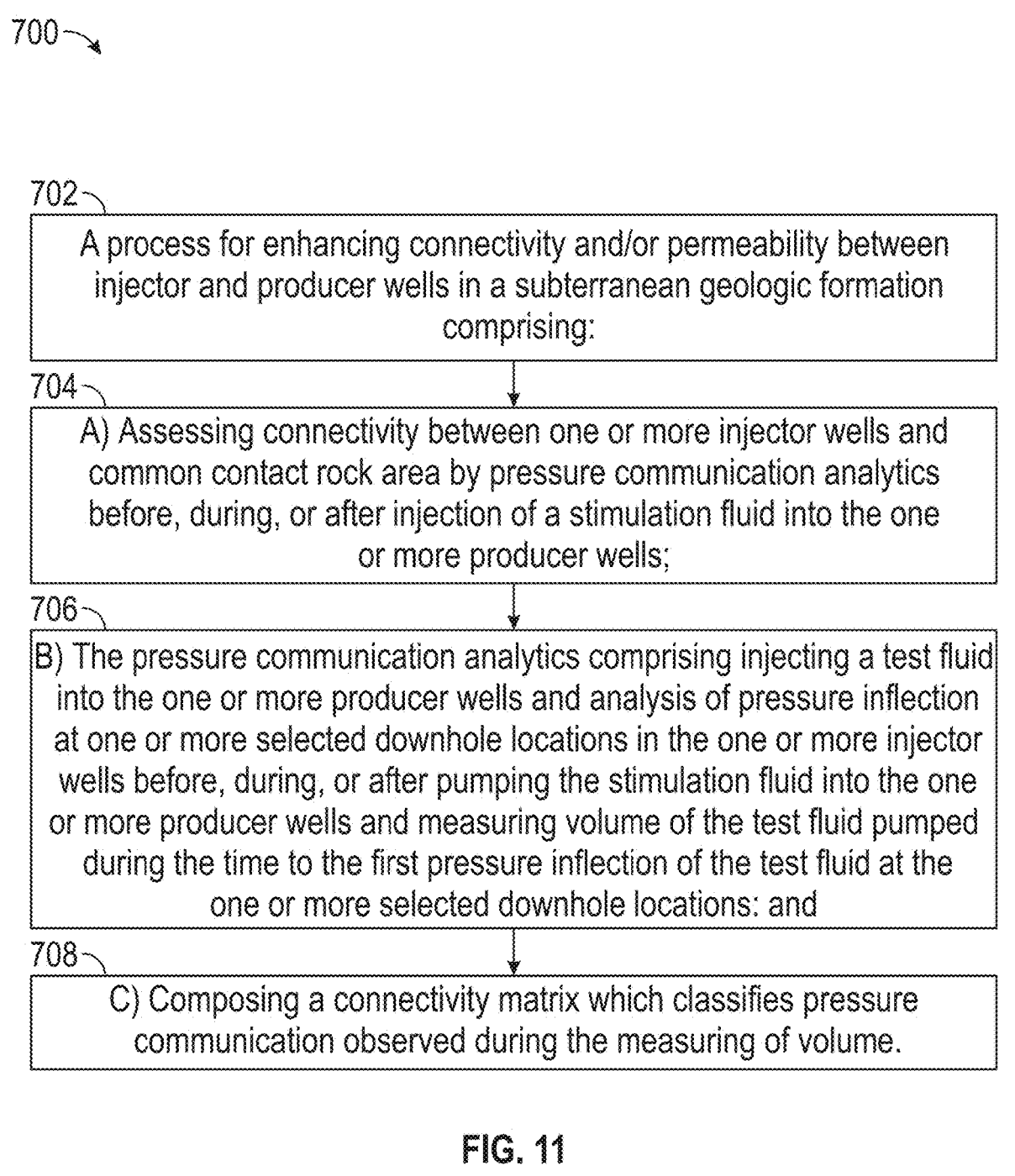

A process for enhancing connectivity and/or permeability between injector and producer wells in a subterranean geologic formation comprising:

704

A) Assessing connectivity between one or more injector wells and common contact rock area by pressure communication analytics before, during, or after injection of a stimulation fluid into the one or more producer wells;

706

B) The pressure communication analytics comprising injecting a test fluid into the one or more producer wells and analysis of pressure inflection at one or more selected downhole locations in the one or more injector wells before, during, or after pumping the stimulation fluid into the one or more producer wells and measuring volume of the test fluid pumped during the time to the first pressure inflection of the test fluid at the one or more selected downhole locations: and

708

C) Composing a connectivity matrix which classifies pressure communication observed during the measuring of volume.

Figure 12:
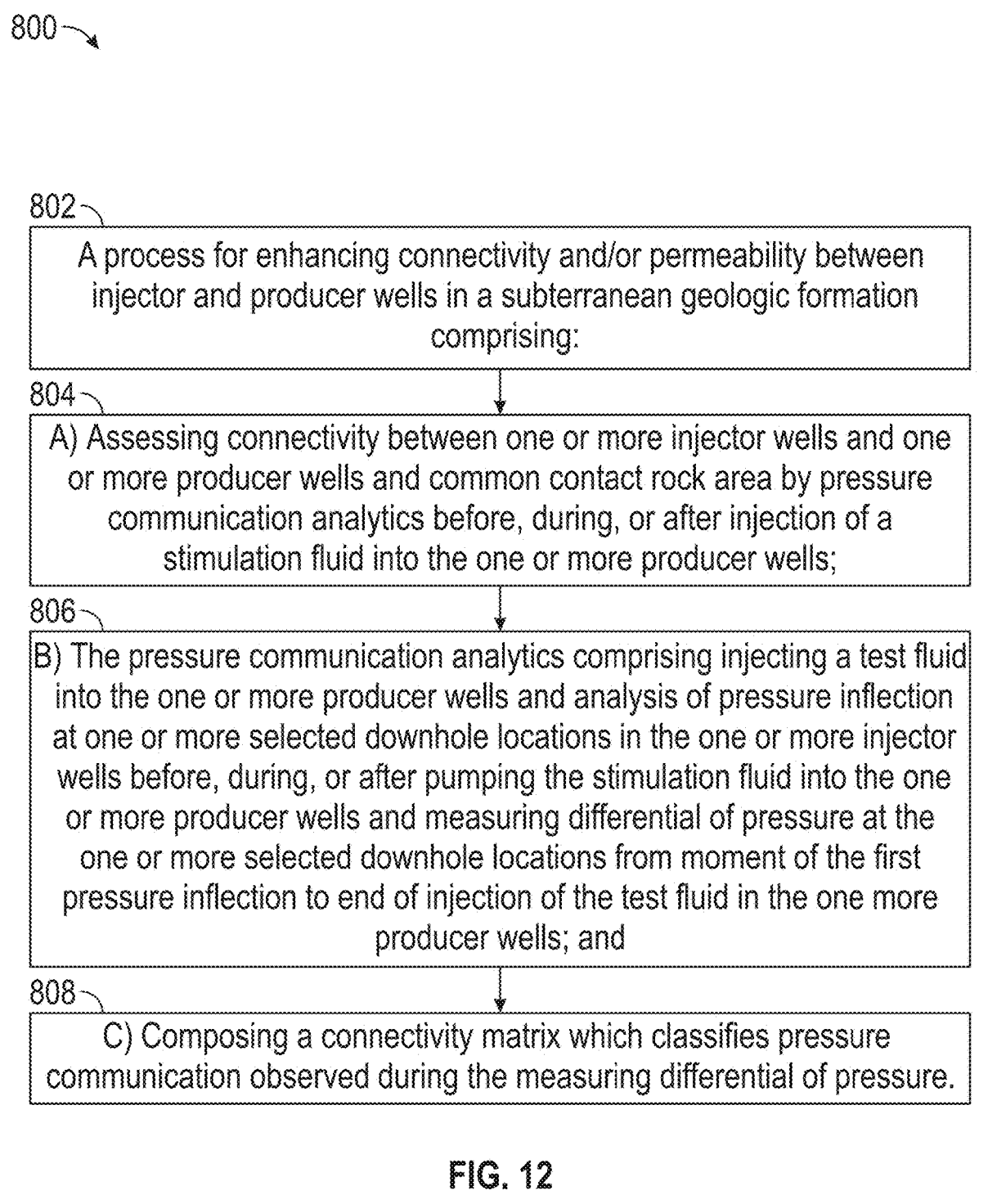

A process for enhancing connectivity and/or permeability between injector and producer wells in a subterranean geologic formation comprising:

804 ⟍

A) Assessing connectivity between one or more injector wells and one or more producer wells and common contact rock area by pressure communication analytics before, during, or after injection of a stimulation fluid into the one or more producer wells;

806 ⟍

B) The pressure communication analytics comprising injecting a test fluid into the one or more producer wells and analysis of pressure inflection at one or more selected downhole locations in the one or more injector wells before, during, or after pumping the stimulation fluid into the one or more producer wells and measuring differential of pressure at the one or more selected downhole locations from moment of the first pressure inflection to end of injection of the test fluid in the one more producer wells; and

808 ⟍

C) Composing a connectivity matrix which classifies pressure communication observed during the measuring differential of pressure.

Figure 13:
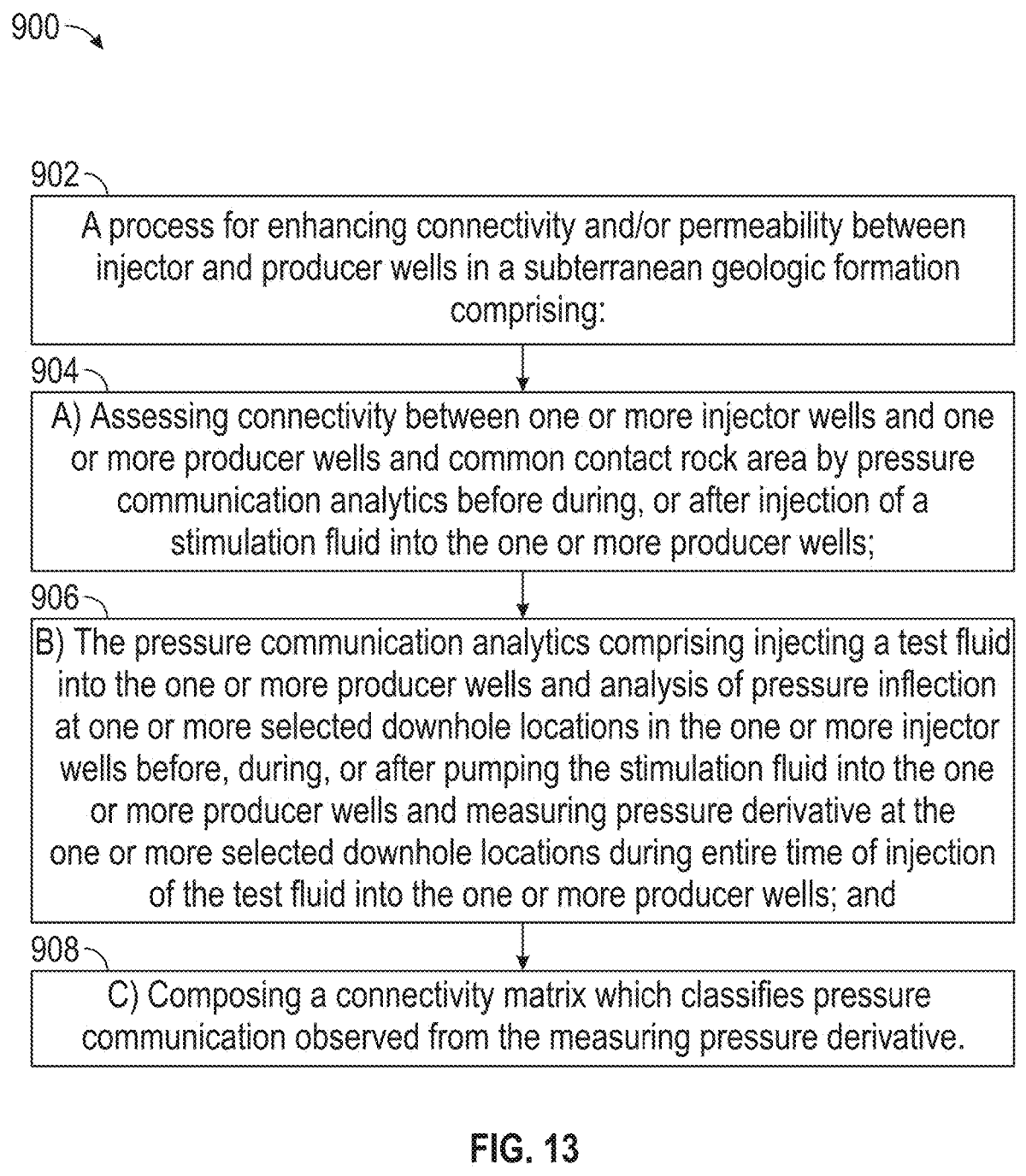

A process for enhancing connectivity and/or permeability between injector and producer wells in a subterranean geologic formation comprising:

904

A) Assessing connectivity between one or more injector wells and one or more producer wells and common contact rock area by pressure communication analytics before during, or after injection of a stimulation fluid into the one or more producer wells;

906

B) The pressure communication analytics comprising injecting a test fluid into the one or more producer wells and analysis of pressure inflection at one or more selected downhole locations in the one or more injector wells before, during, or after pumping the stimulation fluid into the one or more producer wells and measuring pressure derivative at the one or more selected downhole locations during entire time of injection of the test fluid into the one or more producer wells; and

908

C) Composing a connectivity matrix which classifies pressure communication observed from the measuring pressure derivative.

Figure 14:
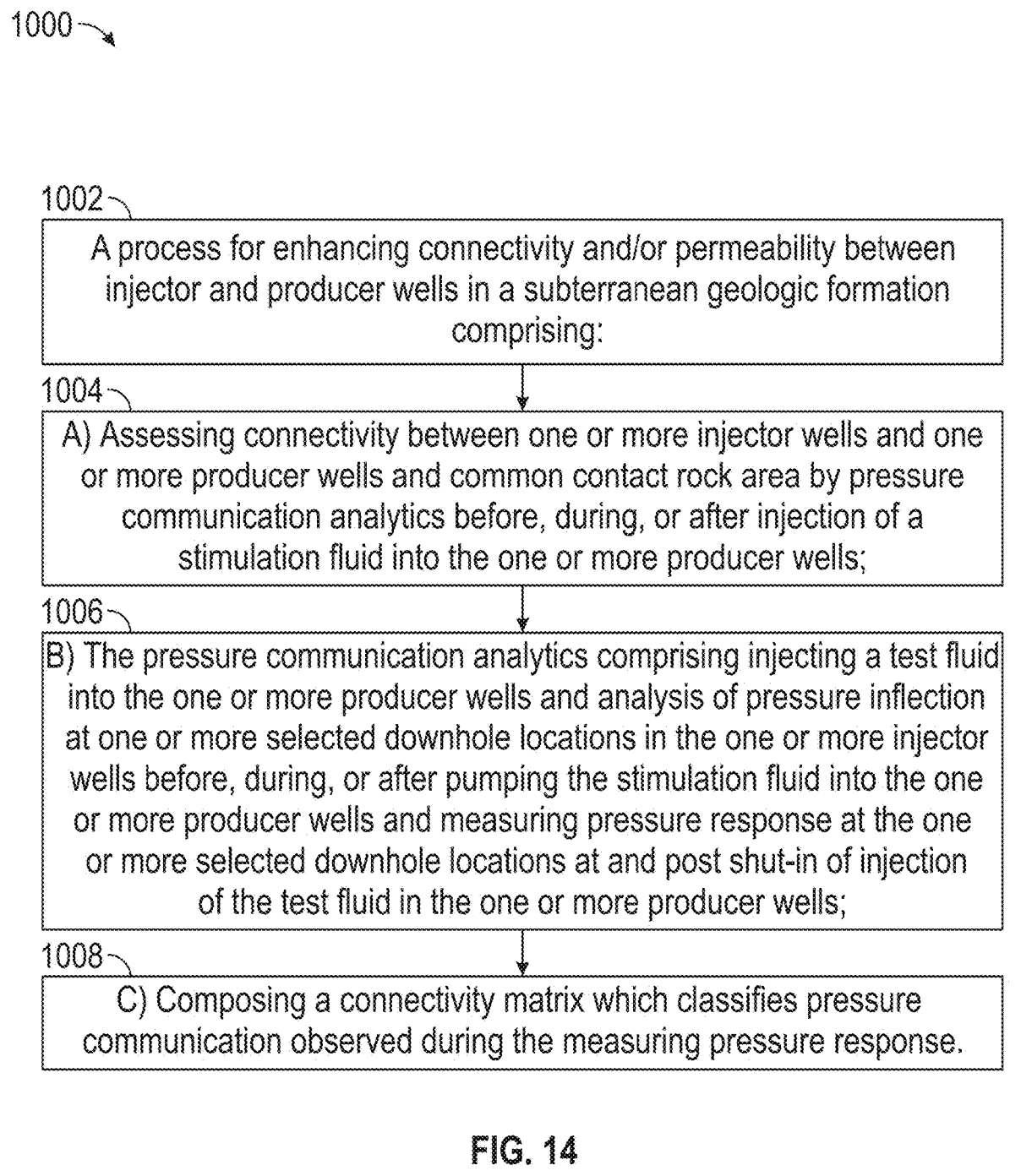

A process for enhancing connectivity and/or permeability between injector and producer wells in a subterranean geologic formation comprising:

1004

A) Assessing connectivity between one or more injector wells and one or more producer wells and common contact rock area by pressure communication analytics before, during, or after injection of a stimulation fluid into the one or more producer wells;

1006

B) The pressure communication analytics comprising injecting a test fluid into the one or more producer wells and analysis of pressure inflection at one or more selected downhole locations in the one or more injector wells before, during, or after pumping the stimulation fluid into the one or more producer wells and measuring pressure response at the one or more selected downhole locations at and post shut-in of injection of the test fluid in the one or more producer wells;

1008

C) Composing a connectivity matrix which classifies pressure communication observed during the measuring pressure response.

Figure 15:
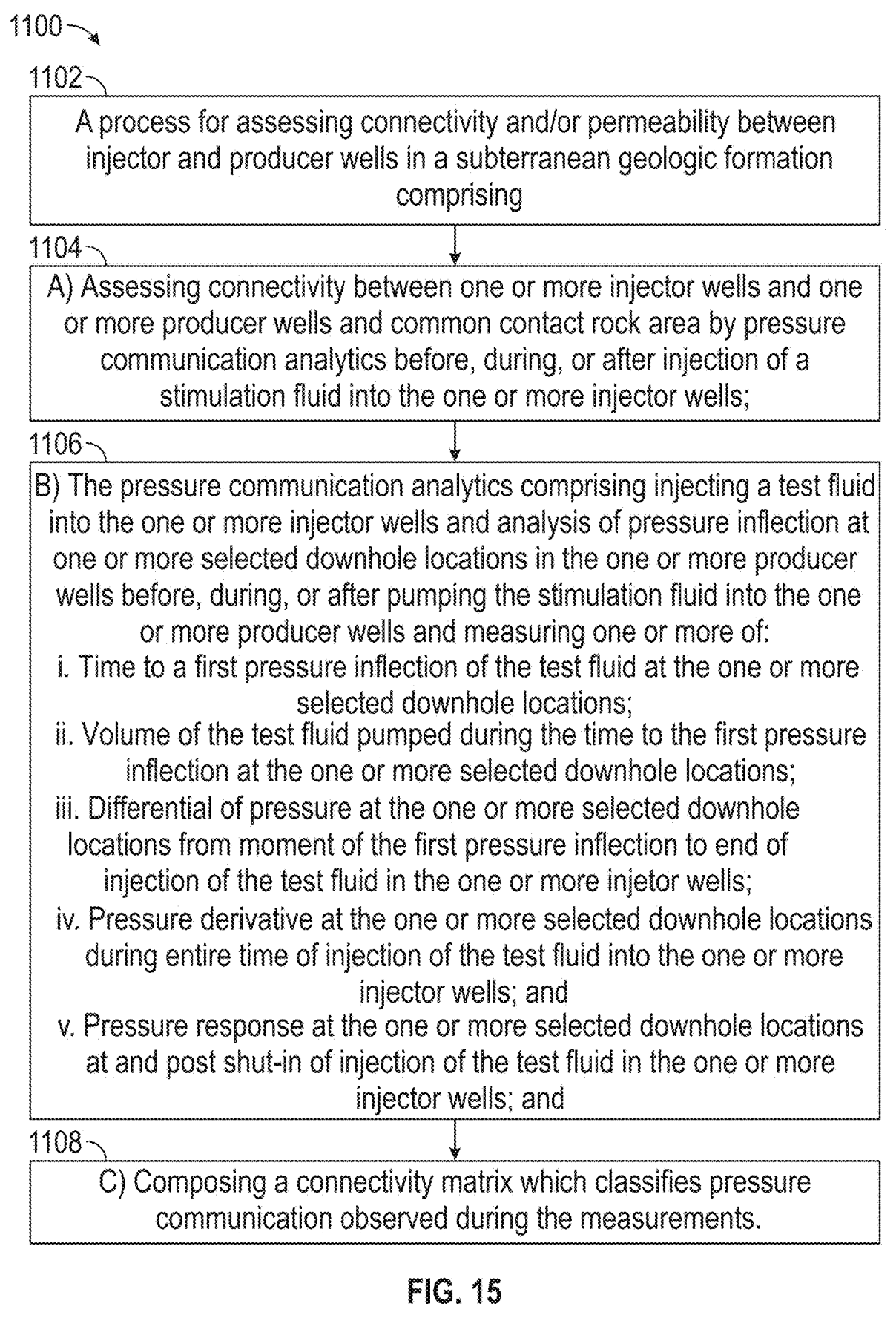

A process for assessing connectivity and/or permeability between injector and producer wells in a subterranean geologic formation comprising

1104

A) Assessing connectivity between one or more injector wells and one or more producer wells and common contact rock area by pressure communication analytics before, during, or after injection of a stimulation fluid into the one or more injector wells;

1106

B) The pressure communication analytics comprising injecting a test fluid into the one or more injector wells and analysis of pressure inflection at one or more selected downhole locations in the one or more producer wells before, during, or after pumping the stimulation fluid into the one or more producer wells and measuring one or more of:
  i. Time to a first pressure inflection of the test fluid at the one or more selected downhole locations;
  ii. Volume of the test fluid pumped during the time to the first pressure inflection at the one or more selected downhole locations;
  iii. Differential of pressure at the one or more selected downhole locations from moment of the first pressure inflection to end of injection of the test fluid in the one or more injetor wells;
  iv. Pressure derivative at the one or more selected downhole locations during entire time of injection of the test fluid into the one or more injector wells; and
  v. Pressure response at the one or more selected downhole locations at and post shut-in of injection of the test fluid in the one or more injector wells; and

1108

C) Composing a connectivity matrix which classifies pressure communication observed during the measurements.

Figure 16:
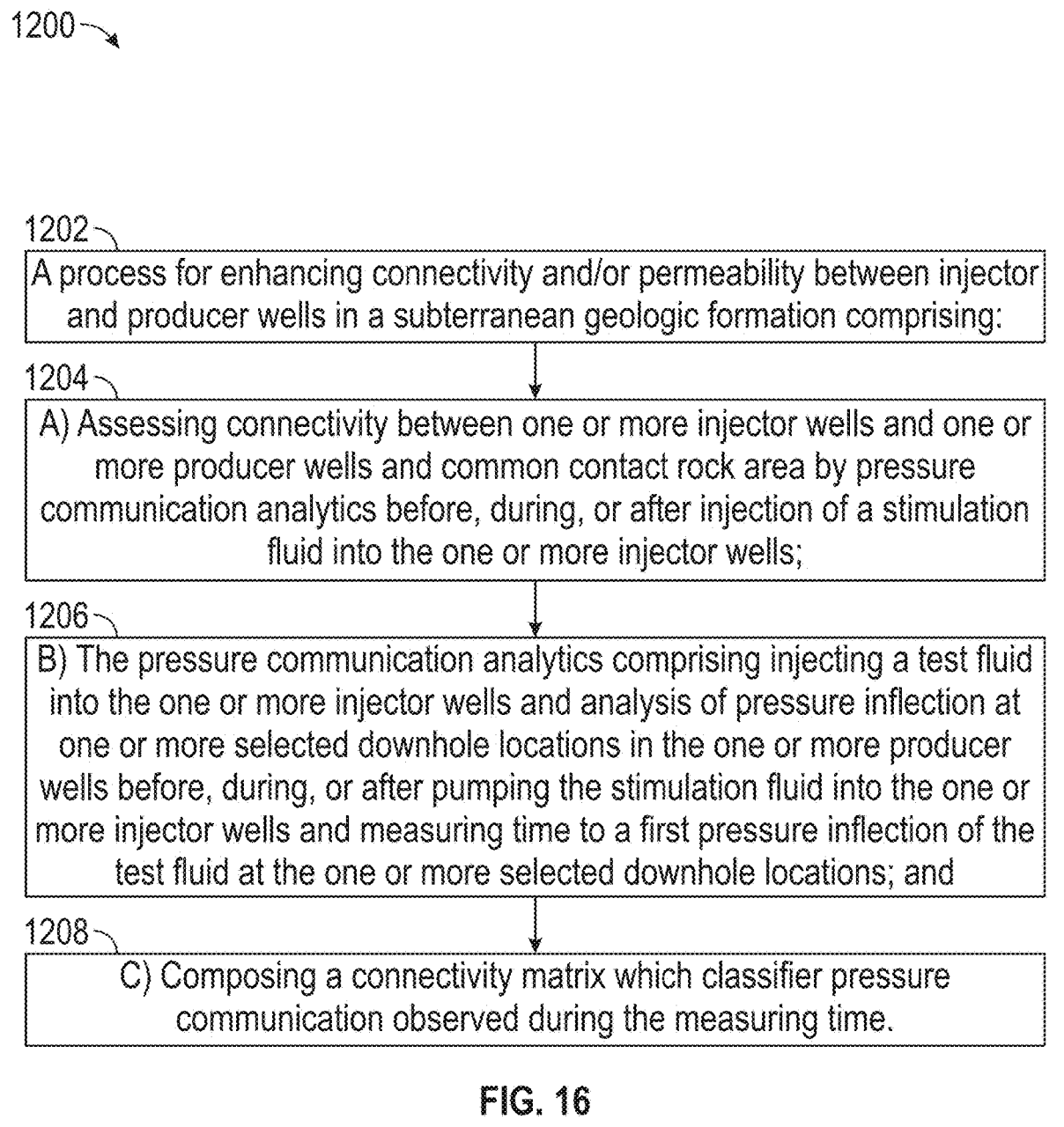

A process for enhancing connectivity and/or permeability between injector and producer wells in a subterranean geologic formation comprising:

1204 ⌐

A) Assessing connectivity between one or more injector wells and one or more producer wells and common contact rock area by pressure communication analytics before, during, or after injection of a stimulation fluid into the one or more injector wells;

1206 ⌐

B) The pressure communication analytics comprising injecting a test fluid into the one or more injector wells and analysis of pressure inflection at one or more selected downhole locations in the one or more producer wells before, during, or after pumping the stimulation fluid into the one or more injector wells and measuring time to a first pressure inflection of the test fluid at the one or more selected downhole locations; and

1208 ⌐

C) Composing a connectivity matrix which classifier pressure communication observed during the measuring time.

Figure 17:
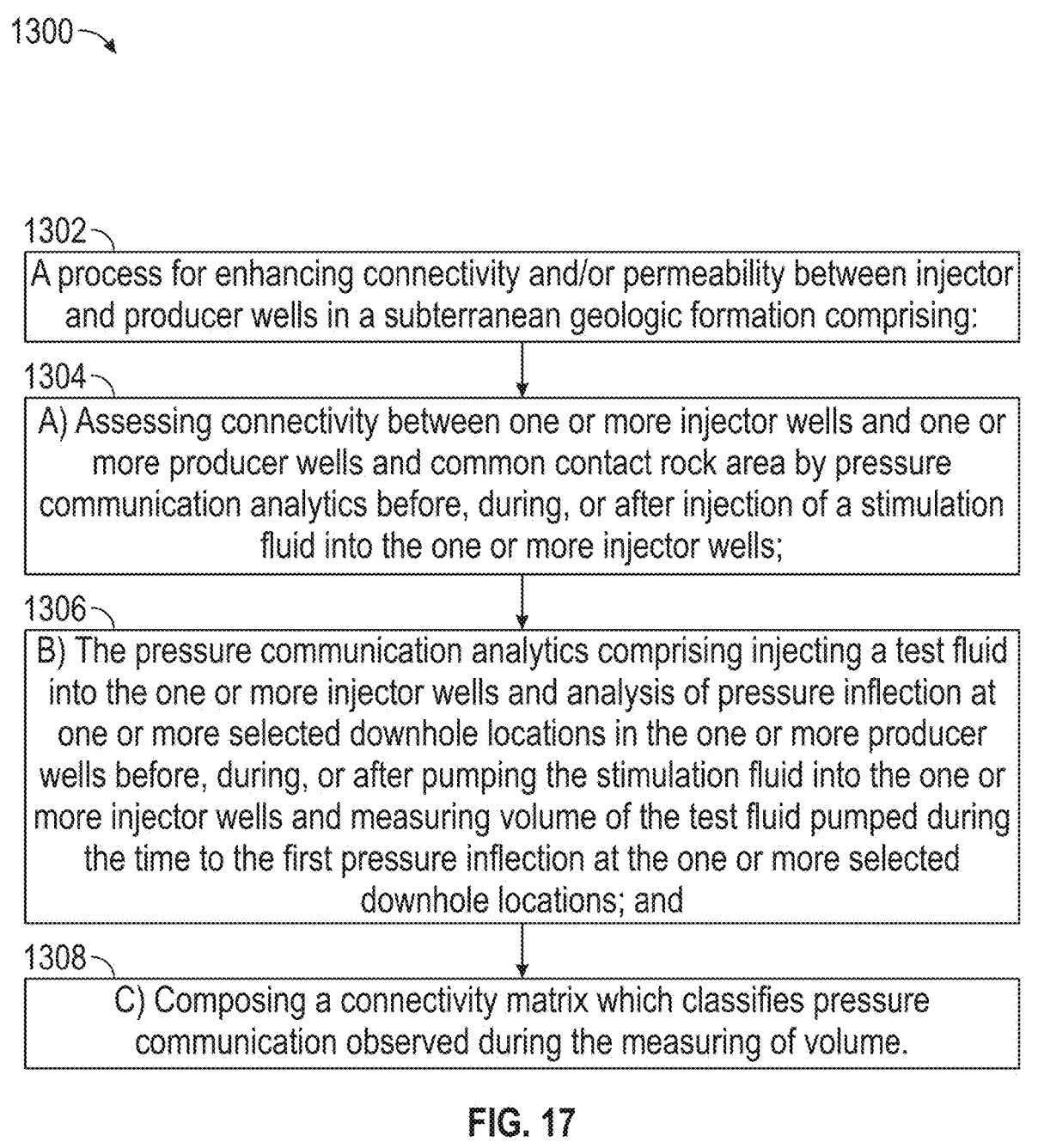

A process for enhancing connectivity and/or permeability between injector and producer wells in a subterranean geologic formation comprising:

1304 —

A) Assessing connectivity between one or more injector wells and one or more producer wells and common contact rock area by pressure communication analytics before, during, or after injection of a stimulation fluid into the one or more injector wells;

1306 —

B) The pressure communication analytics comprising injecting a test fluid into the one or more injector wells and analysis of pressure inflection at one or more selected downhole locations in the one or more producer wells before, during, or after pumping the stimulation fluid into the one or more injector wells and measuring volume of the test fluid pumped during the time to the first pressure inflection at the one or more selected downhole locations; and

1308 —

C) Composing a connectivity matrix which classifies pressure communication observed during the measuring of volume.

Figure 18:
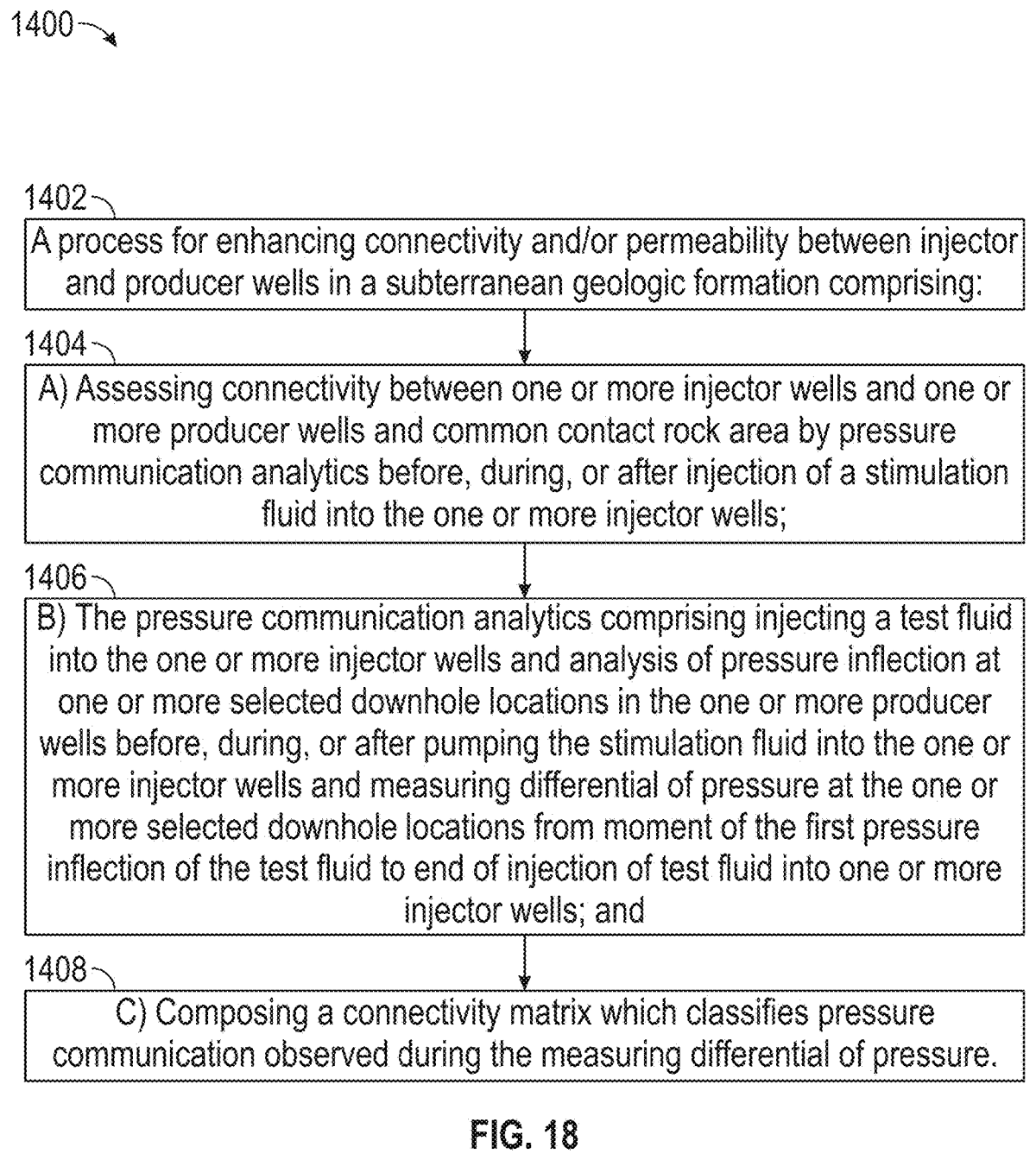

A process for enhancing connectivity and/or permeability between injector and producer wells in a subterranean geologic formation comprising:

1404 —

A) Assessing connectivity between one or more injector wells and one or more producer wells and common contact rock area by pressure communication analytics before, during, or after injection of a stimulation fluid into the one or more injector wells;

1406 —

B) The pressure communication analytics comprising injecting a test fluid into the one or more injector wells and analysis of pressure inflection at one or more selected downhole locations in the one or more producer wells before, during, or after pumping the stimulation fluid into the one or more injector wells and measuring differential of pressure at the one or more selected downhole locations from moment of the first pressure inflection of the test fluid to end of injection of test fluid into one or more injector wells; and

1408 —

C) Composing a connectivity matrix which classifies pressure communication observed during the measuring differential of pressure.

Figure 19:
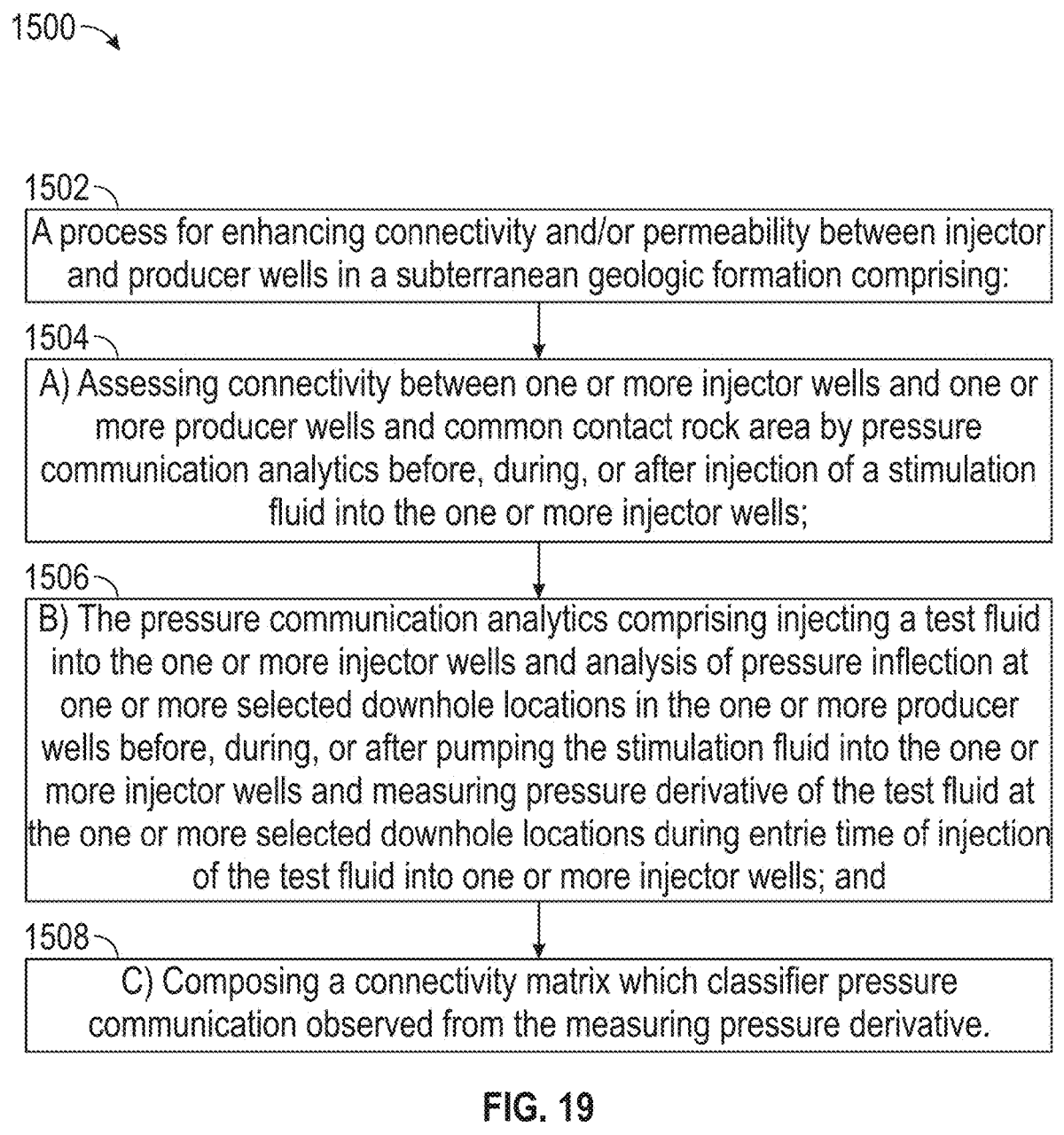

A process for enhancing connectivity and/or permeability between injector and producer wells in a subterranean geologic formation comprising:

1504 ⟍

A) Assessing connectivity between one or more injector wells and one or more producer wells and common contact rock area by pressure communication analytics before, during, or after injection of a stimulation fluid into the one or more injector wells;

1506 ⟍

B) The pressure communication analytics comprising injecting a test fluid into the one or more injector wells and analysis of pressure inflection at one or more selected downhole locations in the one or more producer wells before, during, or after pumping the stimulation fluid into the one or more injector wells and measuring pressure derivative of the test fluid at the one or more selected downhole locations during entrie time of injection of the test fluid into one or more injector wells; and

1508 ⟍

C) Composing a connectivity matrix which classifier pressure communication observed from the measuring pressure derivative.

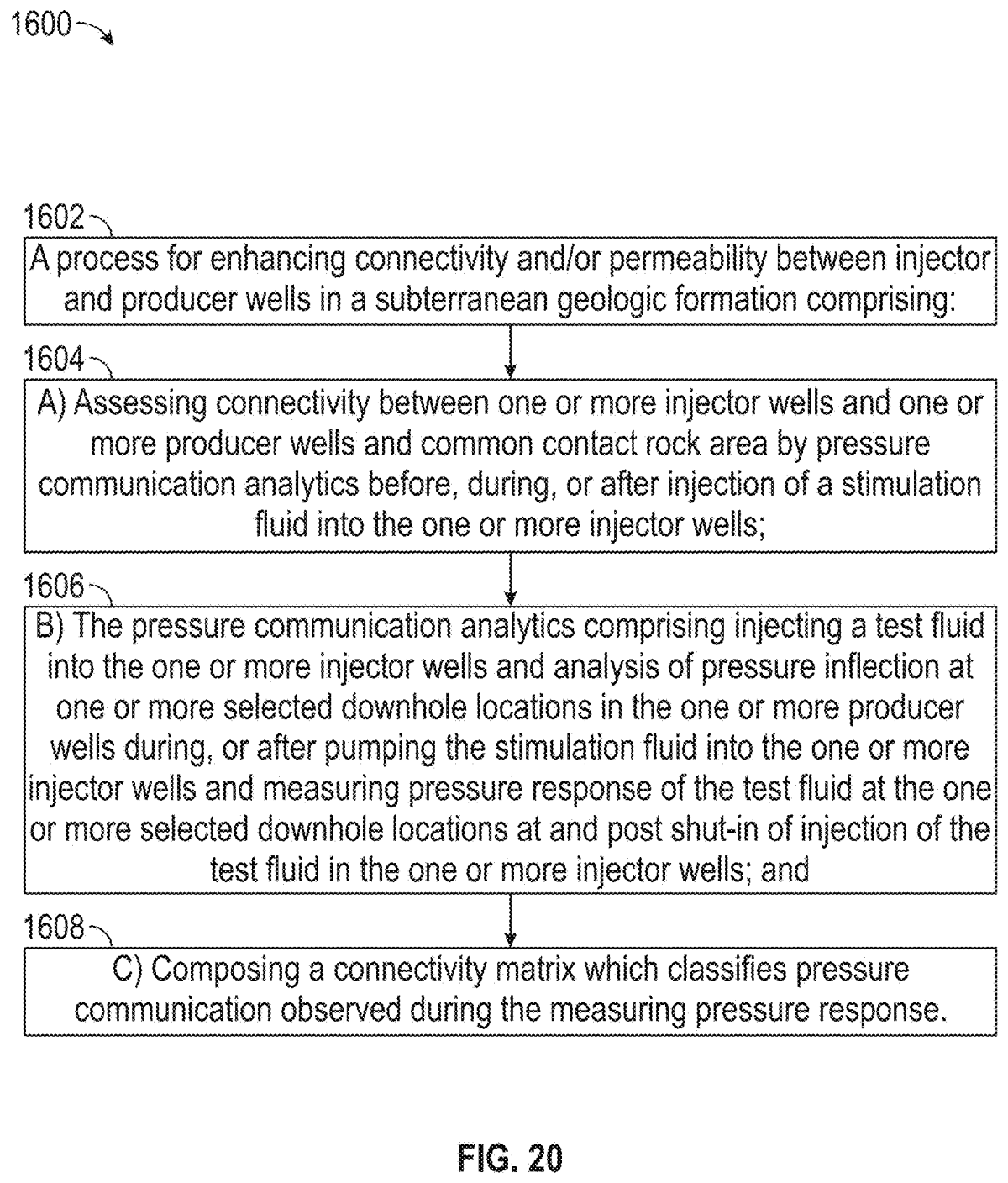

A process for enhancing connectivity and/or permeability between injector and producer wells in a subterranean geologic formation comprising:

1604

A) Assessing connectivity between one or more injector wells and one or more producer wells and common contact rock area by pressure communication analytics before, during, or after injection of a stimulation fluid into the one or more injector wells;

1606

B) The pressure communication analytics comprising injecting a test fluid into the one or more injector wells and analysis of pressure inflection at one or more selected downhole locations in the one or more producer wells during, or after pumping the stimulation fluid into the one or more injector wells and measuring pressure response of the test fluid at the one or more selected downhole locations at and post shut-in of injection of the test fluid in the one or more injector wells; and

1608

C) Composing a connectivity matrix which classifies pressure communication observed during the measuring pressure response.

FIG. 20

MAXIMIZING STIMULATION EFFICIENCY AND CONTACT AREA FOR HEAT HARVESTING

CROSS-REFERENCE TO RELATED APPLICATIONS

This application may be related to assignee's earlier filed and granted U.S. Pat. No. 12,247,470 and 12,305,893, which are incorporated by reference herein in their entirety.

BACKGROUND INFORMATION

Technical Field

The present disclosure relates generally to systems and processes for assessing or diagnosing connectivity between injector and producer wells in geologic (in particular geothermal) systems based on pressure inflection analysis when pumping from injector(s) to producer(s) or vice versa, and more particularly to systems and processes for establishing a connectivity matrix and delineating quality of well connectivity through poroelastic, direct or natural fracture systems.

Background Art

A naturally occurring geothermal system, known as a hydrothermal system, is defined by three key elements: heat, fluid, and permeability at depth. An Enhanced Geothermal System (EGS) is a man-made reservoir, created where there is hot rock but insufficient or little natural permeability or fluid saturation. In an EGS, fluid is injected into the subsurface under carefully controlled conditions, which cause pre-existing fractures to re-open, creating permeability. What is an Enhanced Geothermal System (EGS)? U. S. Dept. of Energy, DOE/EE-0785 September 2012. A different approach, closed-loop geothermal systems (CLGS), overcomes permeability issues by circulating a working fluid through a sealed downhole heat exchanger to absorb and transport heat. CLGS is a versatile technology that can be implemented in a wide variety of different well pipe configurations using a choice of working fluids (such as water and sCO2) to optimize site specific costs and performance. Muir, New Opportunities and Applications for Closed-Loop Geothermal Energy Systems, Geothermal Rising Bulletin, December 2020, Vol. 49, No. 4.

Extraction of heat from Dry Hot Rock (DHR) presents several efficiency and power advantages over other EGS or CLGS approaches for geothermal energy recovery. To efficiently extract DHR heat, horizontal wells are drilled within the resource. However, in order to efficiently extract DHR heat, there is a requirement of horizontal well/vertical well deployment within the basement rock to maximize area of contact. In order for drilled horizontal wells to yield optimal contact area with the basement rock to enable sufficient energy intensity output on the surface, it would be helpful to know the quality of well connectivity between on or more injector wells and one or more producer wells prior to, during, and/or after stimulation of one or more of these wells.

As may be seen, current practices may not be adequate for all circumstances, and do not address the noted problems with respect to extracting heat from DHR. There remains a need for more robust systems and processes for assessing and/or diagnosing connectivity between injector and connector wells in general, and more specifically prior to, during, and/or after stimulation of injector and/or producer wells in EGS in real time. The systems and processes of the present disclosure are directed to these needs.

SUMMARY

In accordance with the present disclosure, systems and processes are described which reduce or overcome many of the faults of previously known systems and processes. The systems and processes of connectivity diagnostics of the present disclosure enable understanding of type of connections in the stimulated system area and enable decisions in real time to make changes in stimulation to design and maximize connection for heat harvesting. The systems and processes of assessing and diagnosing connectivity apply to horizontal, vertical and deviated wells contacting subterranean reservoirs. When applied to EGS, the systems and processes of the present disclosure may be used in systems below and above supercritical conditions but not limited to a minimum or maximum temperature. We have discovered that in order to efficiently connect vertical/horizontal wells in EGS through stimulation, it is necessary to understand the connectivity potential of the stimulated injector well before, during, and after the stimulation of the producer well in order to make real time changes and maximize chances of connectivity and communication for a post stimulation heat harvesting maximized effort. When we say 'before, during and after injection' we are talking about the base fluid that is usually water. The connection is established through pressure and the fluid can be regular water during an injection test, or if it is a main stimulation job, then it can be a linear gel, a crosslinked fluid, a foamed fluid, and the like. The methods and systems of the present disclosure, sometimes referred to under the trade designation FRACCONECT, are diagnosis tools applied based on the pressure behavior attributes of "produced fluids" or "observed fluids" in certain wells, as explained further herein. The observed fluid, in general, may be gaseous fluid, liquid fluid, mixtures of gas and liquid, foams, gels. The source of the fluids' type is what is being pumped/injected into a well (producer or injector), and fluids can be referred to generically as "pumpable material" or even more generally "test fluid." The connectivity of the geologic formation before stimulation can be tested using fluids of all physical forms (gas, liquid, mix, and the like) and the diagnosis is the signature in one or more "adjacent well(s)" or "observational well(s)", which may be injector or producer well(s). Observable attributes include: (a) arrival time of a fluid at an observational well; (b) volumetric recovery at an observational well; (c) behavior of shut-in pressure decline; and, in case of multiple observation wells, (d) directional path inferred from differential arrival times between observation wells. During stimulation, the observed fluids in adjacent (observational) wells may be stimulation fluids (gas, fluids, mixture, foams) or displaced natural ground "pore" and/or natural ground fracture fluids in the reservoir pushed out by the stimulation fluid, or stimulation leak-off. These fluids are mostly ground waters, brines, mixtures of fluids and gases. However, depending on the downhole conditions of pressure and temperature, the displaced fluids can take different physical forms (water, steam, mixtures). After stimulation, the observed fluid again may be fluids as before stimulation, such as gas, water, mixture, however, the injection conditions are designed and monitored to ensure that previously created fractures are not disturbed and/or conductivity maintained.

A first aspect of the disclosure is a process for enhancing connectivity and/or permeability between injector and producer wells in a subterranean geologic formation (in certain embodiments, a geothermal formation between one or more injector wells and one or more producer wells) comprising (or consisting essentially of, or consisting of):

a) assessing connectivity between one or more injector wells and one or more producer wells and common contact rock area by pressure communication analytics before, during or after injection of a stimulation fluid (liquid, gas, or mixture thereof) into the one or more producer wells;

b) the pressure communication analytics comprising injecting a test fluid (sometimes referred to as treatment fluid) and analysis of pressure inflection at one or more selected downhole locations (which may be in the one or more injector wells, in the one or more producer wells, or any combination thereof) before, during or after injecting (pumping in case of liquid) the stimulation fluid into the one or more producer wells and measuring one or more of:

i. time to a first pressure inflection of the test fluid (or other displaced fluid) at the one or more selected downhole locations;

ii. volume of the test fluid injected or pumped during the time to the first pressure inflection at the one or more selected downhole locations;

iii. differential of pressure at the one or more selected downhole locations from moment of the first pressure inflection to end of injection of the test fluid in the one or more producer wells;

iv. pressure derivative at the one or more selected downhole locations during entire time of injection of the test fluid into the one or more producer wells; and v. pressure response at the one or more selected downhole locations at and post shut-in of injection of the test fluid in the one or more producer wells; and c) composing a connectivity matrix which classifies pressure communication observed during the measurements (in certain embodiments, classified as either a poroelastic communication, hydraulic communication, or direct hit, or some other observed pressure communication).

A second aspect of the disclosure is a process for enhancing connectivity and/or permeability between injector and producer wells in a subterranean geologic formation (in certain embodiments, a geothermal formation between one or more injector wells and one or more producer wells) comprising (or consisting essentially of, or consisting of):

a) assessing connectivity between one or more injector wells and one or more producer wells and common contact rock area by pressure communication analytics before, during or after injection of a stimulation fluid into the one or more injector wells;

b) the pressure communication analytics comprising injecting a test fluid into the one or more injector wells and analysis of pressure inflection at one or more selected downhole locations (which may be in the one or more injector wells, in the one or more producer wells, or any combination thereof) before, during or after injecting the stimulation fluid into the one or more injector wells, and measuring one or more of:

i. time to a first pressure inflection of the test fluid (or other displaced fluid) at the one or more selected downhole locations;

ii. volume of the test fluid injected or pumped during the time to the first pressure inflection of the test fluid at the one or more selected downhole locations;

iii. differential of pressure at the one or more selected downhole locations from moment of the first pressure inflection to end of injection of the test fluid in the one or more injector wells;

iv. pressure derivative at the one or more selected downhole locations during entire time of injection of the test fluid into the one or more injector wells; and v. pressure response at the one or more selected downhole locations at and post shut-in of injection of the test fluid in the one or more injector wells;

c) composing a connectivity matrix which classifies pressure communication observed during the measurements (in certain embodiments, classified as either a poroelastic communication, hydraulic communication, or direct hit, or some other observed pressure communication).

Certain process embodiments further comprise changing (and in certain embodiments, in real time, in other words during the application of the stimulation fluid to a well) one or more parameters of the stimulation fluid and/or other design parameters including, but not limited to, injection/pumping rate, pumping diverter material, and the like, to form a second stimulation fluid to enhance the contacted rock area through stimulation according to the classification of the pressure communication observed during the measurements using the test fluid and the connectivity matrix. In certain embodiments the parameters of the stimulation fluid that may be changed may be selected from temperature, pressure, composition, density, viscosity, conductivity, tracer content, solids content, proppant percentage and/or proppant composition, and/or proppant electrical conductivity (if used), and combinations of any of these. The test fluid may be water, steam, brine, air, bone-dry air, simulated air (mixtures of 79 percent nitrogen and 21 percent oxygen), nitrogen-enriched air, gaseous nitrogen of various purities, gaseous carbon dioxide, brine, viscosified fluid, energizing fluid, polymer based fluid, and combinations and mixtures of any of these.

In certain embodiments the injecting or pumping the test fluid into the one or more producer wells (or one or more injector wells) may comprise injecting or pumping the test fluid at a rate and volume capable of or incapable of tensile fracturing the subterranean geologic formation, generating a downhole pressure that forces the test fluid through existing fractures in the subterranean geologic formation. In certain embodiments the injecting or pumping the test fluid into the one or more producer wells (or one or more injector wells) may comprise injecting or pumping the test fluid in a pulsating mode (for example, but not limited to, sinusoidal) through existing natural fractures ("references"), the pulsing mode having a pulse amplitude below Shmin with frequency determined by rock fabric of the subterranean geologic formation and bottom hole static temperature ("BHST"). In certain embodiments the injecting or pumping the test fluid into the one or more producer wells (or one or more injector wells) may comprise injecting or pumping the test fluid in a long injection period as a hydro-shearing stage, the pump or other device (compressor in the case of gaseous fluids) capable of pumping a volume based on an estimated total porosity of natural fractures encountered in the subterranean geologic formation estimated from a borehole logging tool or from geologic settings of the subterranean geologic formation.

A third aspect of the present disclosure is a system for carrying out the first or second methods, comprising (or consisting essentially of, or consisting of):

a) a sub-system for assessing connectivity between one or more injector wells and one or more producer wells (and vice versa) and common contact rock area by pressure communication analytics before, during or after injection of a stimulation fluid into one or more producer wells or one or more injector wells;

b) the sub-system for assessing connectivity comprising one or more pressure sensors positioned at one or more selected downhole locations in the one or more injector wells (and/or or the one or more producer wells) before, during or after pumping stimulation fluid into the one or more producer wells (or the one or more injector wells), the one or more pressure sensors configured to measure one or more of:

i. a first pressure inflection of a test fluid (or other displaced ground fluid) at the one or more selected downhole locations;

ii. differential of pressure at the one or more selected downhole locations from moment of the first pressure inflection to end of injection of the test fluid in the one or more producer wells (or injector wells);

iii. pressure derivative at the one or more selected downhole locations during entire time of injection of the test fluid into the one or more producer wells (or injector wells); and iv. pressure response at the one or more selected downhole locations at and post shut-in of injection of the test fluid in the one or more producer wells (or the one or more injector wells).

In certain embodiments the systems further include components for measuring time, flow rate, and total flow of test fluid or displaced ground fluid, or mixture thereof, in real time. Certain systems further include software and hardware configured to enter data into and display a connectivity matrix which classifies pressure communication observed during the measurements. As used herein the term "connectivity matrix" means a collection of data in tabular or graphic format, which may be two-dimensional (2D), three-dimensional (3D), or four-dimensional (4D), or more, wherein any of these may include time as a parameter. A "dimension" may be a spatial parameter (using vertical, horizontal, Cartesian, spherical, or cylindrical coordinate systems) or a physical or chemical property, or time. As used herein, the methods and systems of the present disclosure may be applied before a "main stimulation", during, and/or after a main stimulation. If the main stimulation is broken up into timed stages, the quality and nature of connectivity may be assessed using one or more methods and systems of this disclosure between main stimulation stages, and therefore may be considered to be employed during stimulation.

Certain process and system embodiments may comprise wherein the subterranean geologic formation is a subterranean geothermal formation. Certain subterranean geothermal formations may include dry hot rock (DHR), while others may not be dry. In certain systems and processes of the present disclosure the injector well may be cemented. In yet other systems and processes the injector well may be uncemented. The completion type may be selected from open hole, cemented, completed with slotted liner, vertical, deviated or horizontal well.

Certain system and process embodiments may comprise wherein one or more (or all) of the injector wells and/or producer wells are selected from an open hole, a well comprising a liner, and a well selectively segmented by ECP and sliding sleeves or pre-perforated liner. The completion type may be selected from open hole, cemented, completed with slotted liner.

Certain system and process embodiments may comprise one or more pumps and/or compressors, where some of these comprise one or more surface pumps and/or compressors. Yet other systems may comprise one or more surface pumps or compressors for injecting test fluid in tubing (including coiled tubing) or drill pipe, and one or more surface pumps or compressors for injecting the same or different test fluid through an annulus between an inner conduit and casing.

Certain system and process embodiments may comprise wherein the one or more stimulation fluids are selected from water, brine, viscosified fluids, energizing fluids, and polymer based fluids. In certain other system and process embodiments the one or more stimulation fluids may comprise a propping agent, such as sand, bauxite, ceramic particles, petroleum coke, and the like.

In certain system and process embodiments the injector well(s) and/or producer well(s) may be selected from vertical, deviated, and horizontal injector wells.

In certain system and process embodiments the injector well(s) and/or producer well(s) may be configured to utilize single-path injection through either an inner conduit or through an annulus between the inner conduit and casing, wherein the inner conduit is selected from in place tubing, drill pipe, and coiled tubing.

In certain other system and process embodiments the producer well(s) and/or injector well(s) may utilize dual injection paths comprising a first injection path through an inner conduit and a second injection path through an annulus between the inner conduit and casing, wherein the pump comprises a first pump for the first injection path and a second pump for the second injection path, and wherein the inner conduit is selected from in place tubing, drill pipe, and coiled tubing. In these embodiments the one or more fluids may comprise a first fluid pumped by the first pump through the first injection path, and a second fluid pumped by the second pump through the second injection path, wherein the first and second fluids may be the same or different in one or more physical and/or chemical properties.

In certain system and process embodiments the one or more test fluids may be selected from water (either local ground water, or some purified version) during an injection test, or if the test is a main stimulation job, then the "test fluid" can be a linear gel, a crosslinked fluid, a foamed fluid, and the like.

In certain embodiments the systems and processes of the present disclosure may comprise one or more components selected from the group consisting of one or more pressure control devices, (also referred to as chokes), one or more flow measurement devices, one or more accessory equipment, and combinations thereof. In certain embodiments the one or more accessory equipment may be selected from the group consisting of one or more connectors, one or more isolation valves, and one or more pressure relief valves. In certain embodiments the one or more components may comprise one or more redundant components in the system. Certain system embodiments may comprise one or more quick connect/quick disconnect connectors.

In certain embodiments a logic device may be provided to control all or portions of the systems and processes of the present disclosure, and the logic device may be configured to be operated and/or viewed from a Human/Machine Interface (HMI) wired or wirelessly connected to the logic device. Certain embodiments may include one or more audio and/or visual warning devices configured to receive communications from the logic device upon the occurrence of a pressure rise (or fall) in a sensed pressure above (or below) a set point pressure, or a change in concentration of one or more sensed concentrations or temperatures, or both, above one or more set points. The occurrence of a change in other measured parameters outside the intended ranges may also be alarmed in certain embodiments. Other measured parameters may include, but are not limited to, liquid, gas, or mixture of liquid and gas flow rate, and liquid density.

Certain system and process embodiments of this disclosure may operate in modes selected from the group consisting of automatic continuous mode, automatic periodic mode, and manual mode. In certain embodiments the one or more operational equipment may be selected from the group consisting of pneumatic, electric, fuel, hydraulic, and combinations thereof.

In certain embodiments, pressure (P), temperature (T), density, and/or mass flow of test fluid and/or stimulation may be sensed inside the one or more injector and/or one or more producer wells tubing, the annulus, the subterranean geologic formation, or any combination of these. Mass flow sensors may be employed. All combinations of sensing T, P, density, and/or mass flow in the injector and/or producer tubing or inner pipe, in the annulus, and/or in the formation are disclosed herein and considered within the present disclosure.

As used herein "the sub-system for assessing connectivity comprising one or more pressure sensors" may comprise one or more structures including a cabinet, frame, or other structural element supporting (and in some embodiments enclosing) connectivity assessment and/or diagnostic components and associated components, for example, but not limited to components wired or wirelessly connected to pressure sensors, flow rate sensors, temperature sensors, mass flow meters, and the like, and the structure may include pressure control devices (backpressure valves), chokes, pressure relief devices (valves or explosion discs), pipes, conduits, vessels, towers, tanks, mass flow meters, temperature and pressure indicators, heat exchangers, pumps, compressors, and one or more human-visual displays, and the like.

These and other features of the systems and processes of the present disclosure will become more apparent upon review of the brief description of the drawings, the detailed description, and the claims that follow. It should be understood that wherever the term "comprising" is used herein, other embodiments where the term "comprising" is substituted with "consisting essentially of" are explicitly disclosed herein. It should be further understood that wherever the term "comprising" is used herein, other embodiments where the term "comprising" is substituted with "consisting of" are explicitly disclosed herein. Moreover, the use of negative limitations is specifically contemplated; for example, certain producer wells may be devoid of casing; certain injector wells may be devoid of dual injection paths; certain systems may be devoid of more than one pump; certain fluids may be devoid of oils and/or other hydrocarbons, and/or devoid of carcinogenic compounds.

BRIEF DESCRIPTION OF THE DRAWINGS

The manner in which the objectives of this disclosure and other desirable characteristics can be obtained is explained in the following description and attached drawings in which:

FIG. 1 is a graphical illustration of a pressure inflection analysis on a subterranean geologic formation having a

Figure 2:
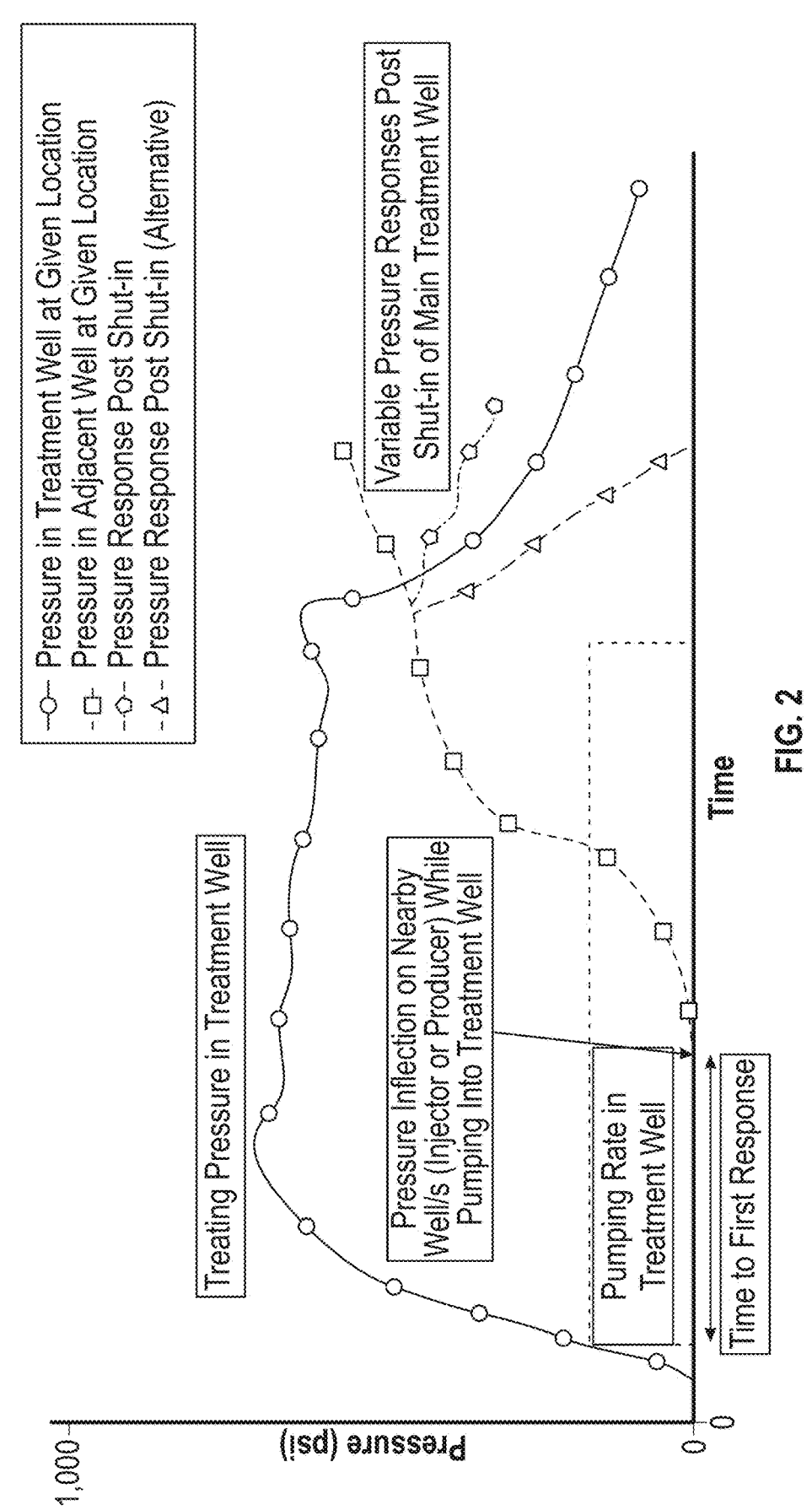
Figure 3:
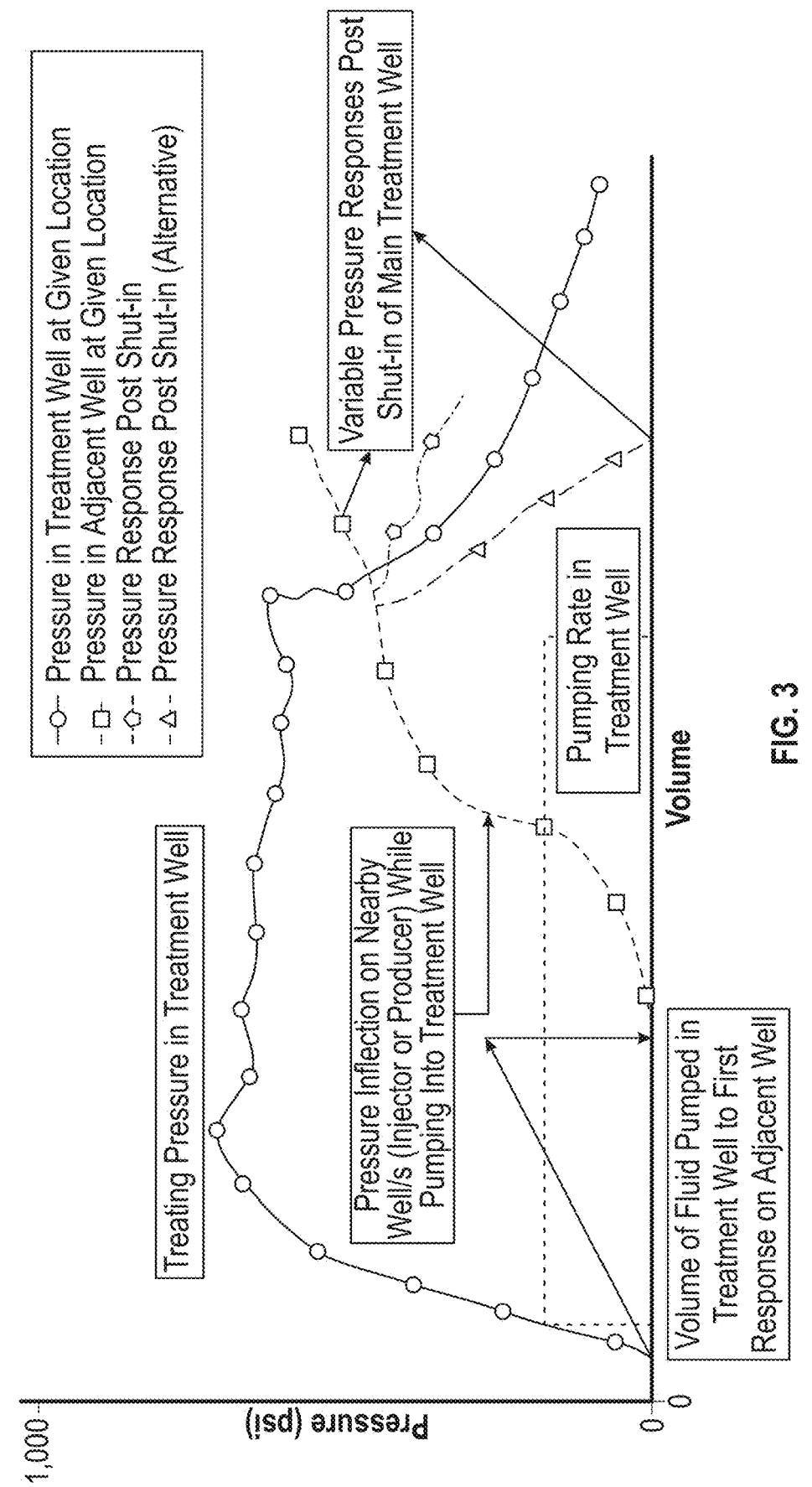
Figure 4:
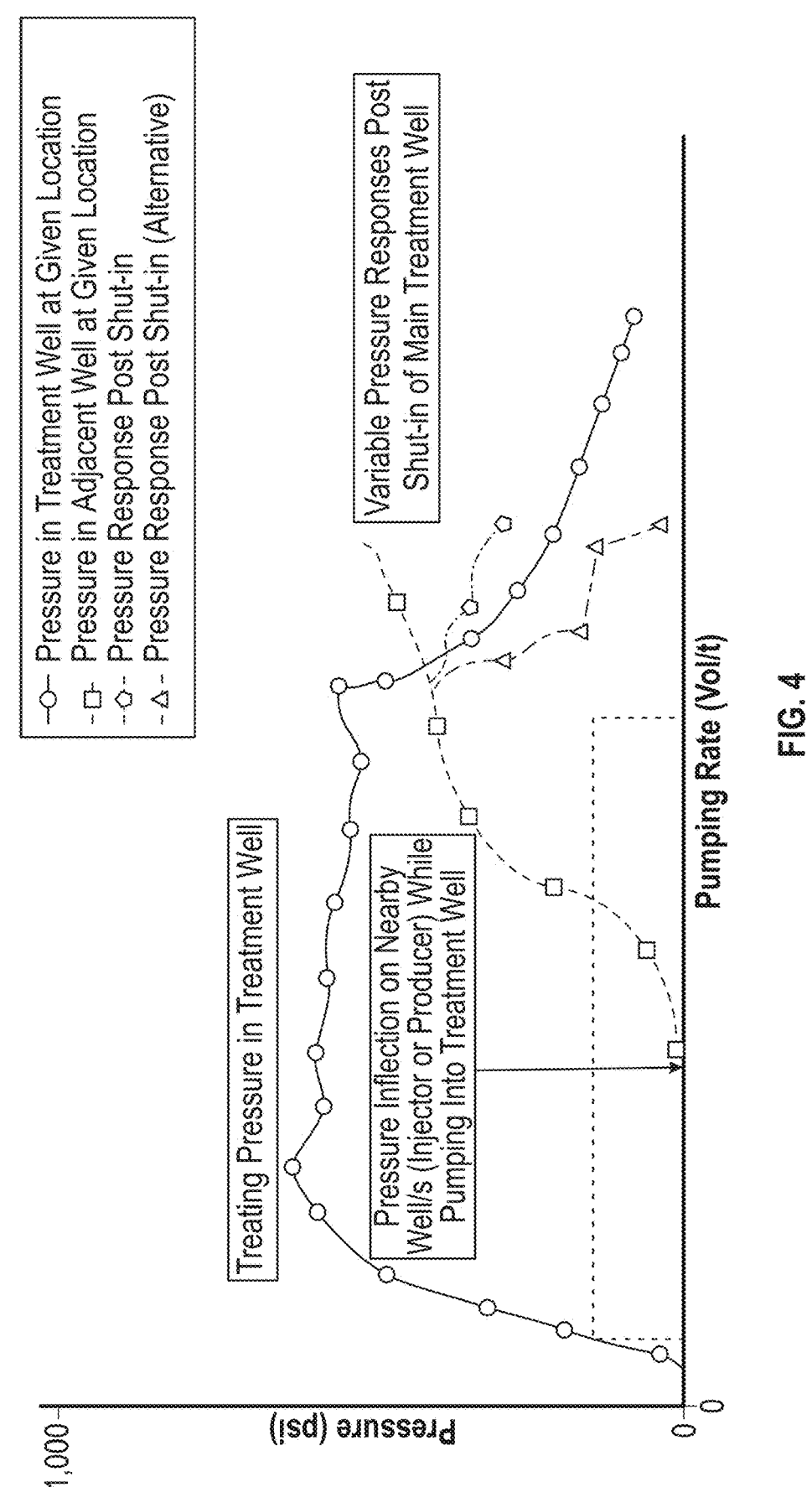
Figure 5:
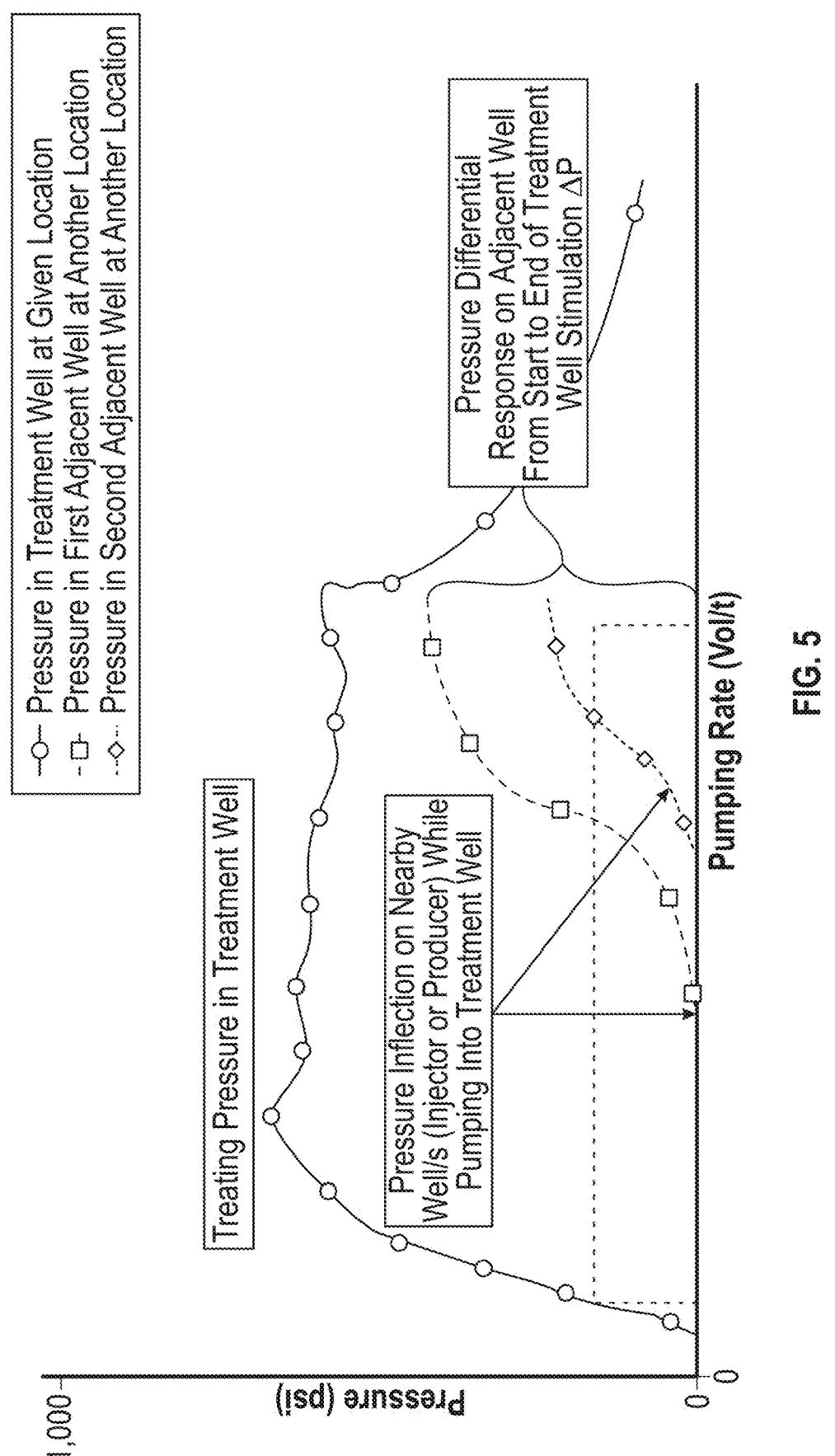
Figure 6:
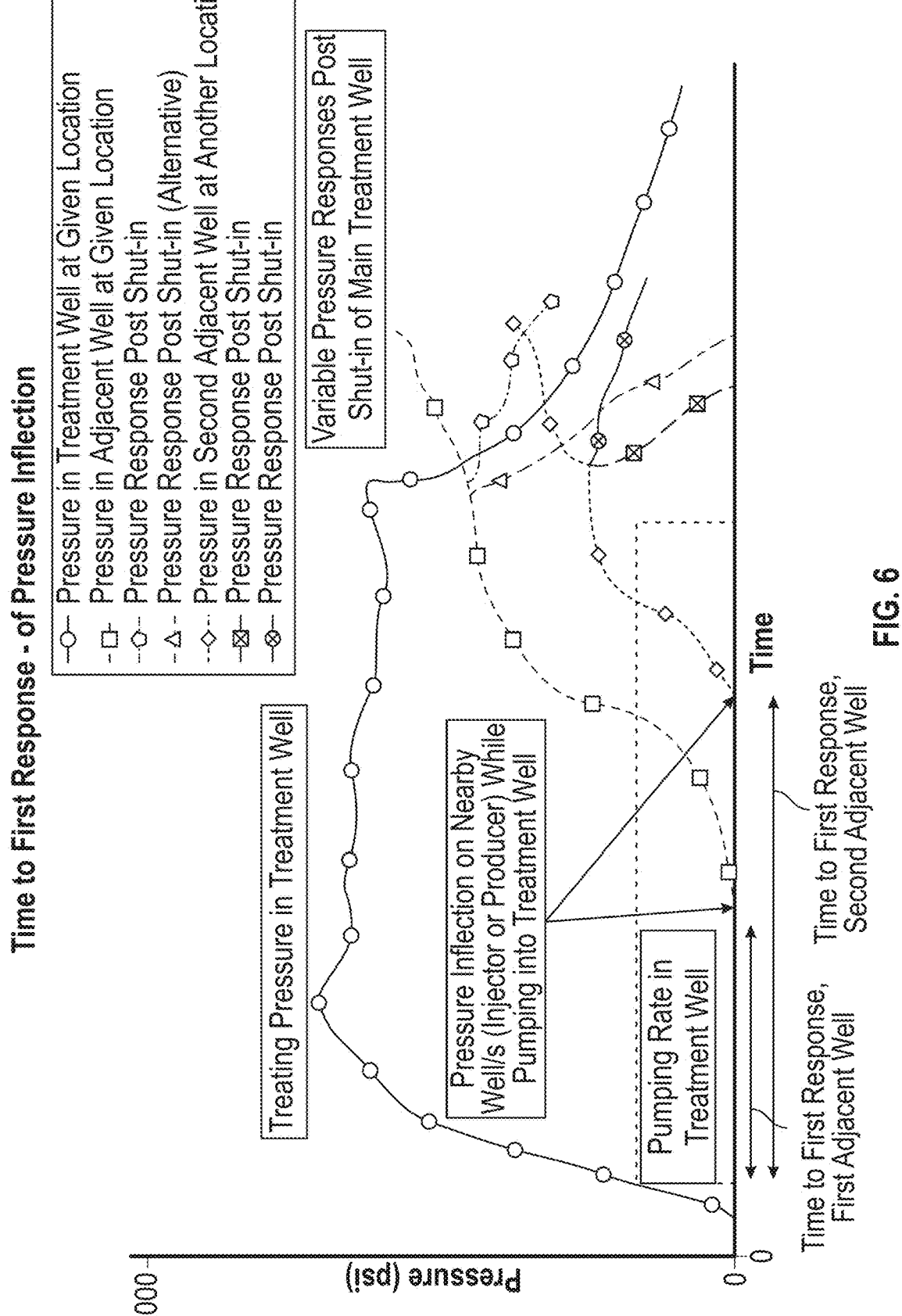
Figure 7:
Figure 8:
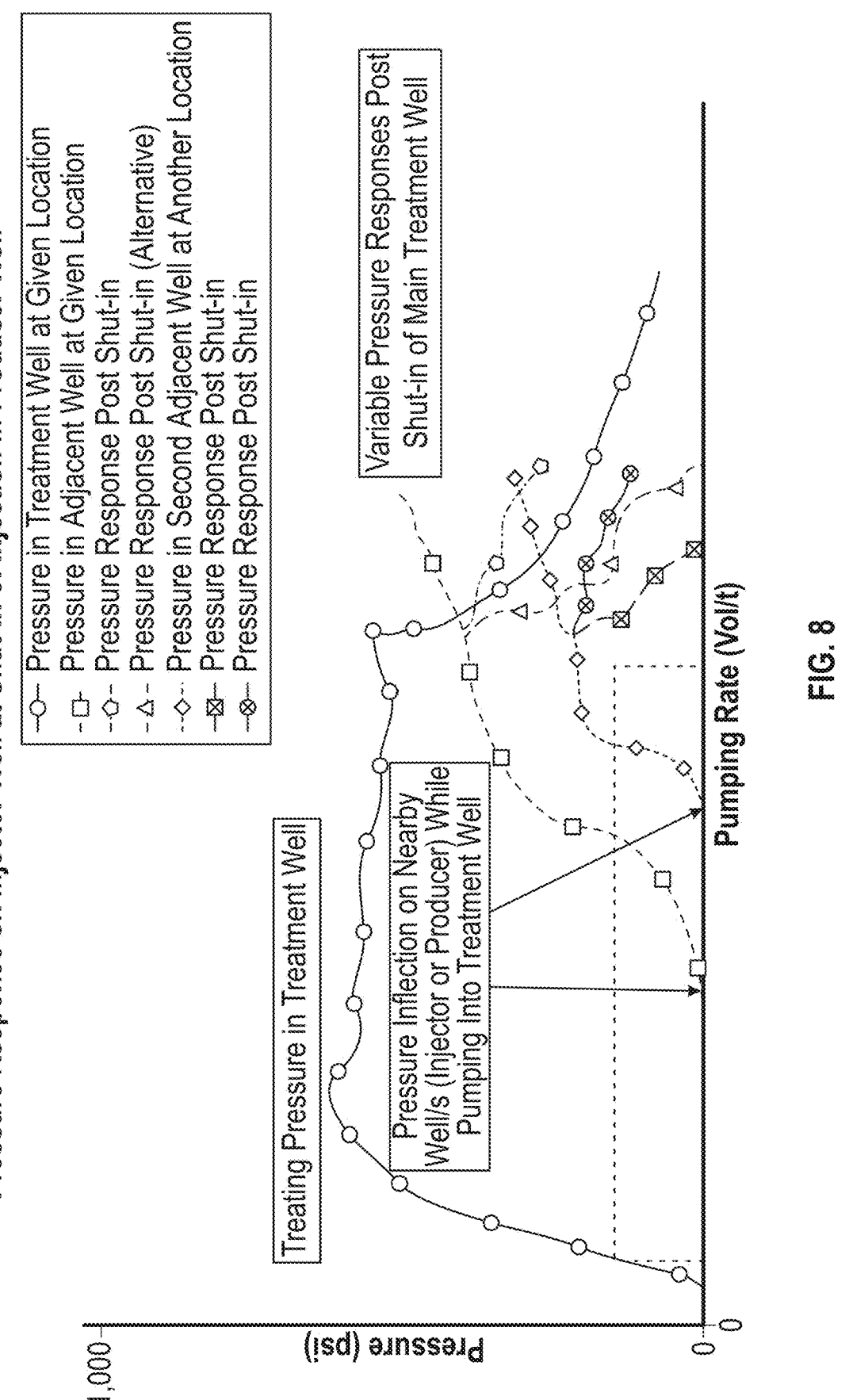
Figure 21:
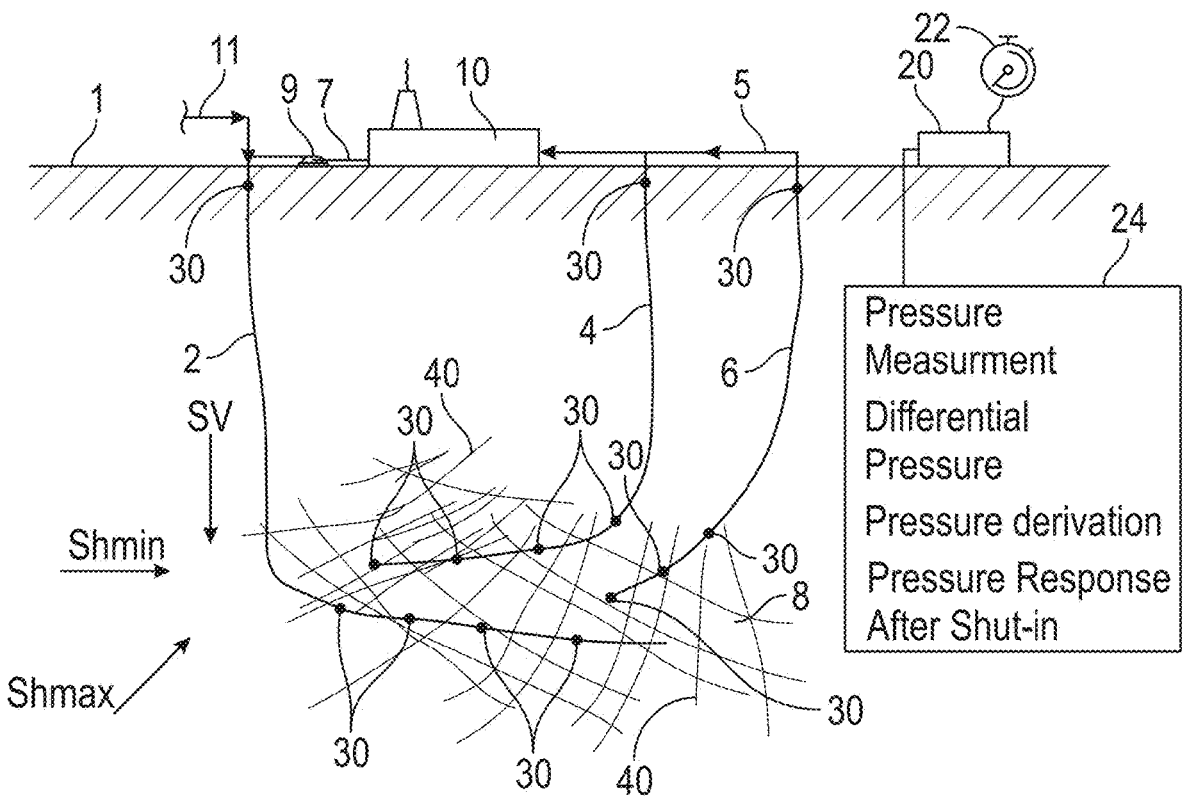

8 treatment well (producer or injector) and an adjacent well (injector or producer) in a method embodiment in accordance with the present disclosure;

FIG. 2 is a graphical illustration of a time to first response—pressure inflection—analysis on a subterranean geologic formation having a treatment well (producer or injector) and an adjacent well (injector or producer) in a method embodiment in accordance with the present disclosure;

FIG. 3 is a graphical illustration of a volume to first response—pressure inflection—analysis on a subterranean geologic formation having a treatment well (producer or injector) and an adjacent well (injector or producer) in a method embodiment in accordance with the present disclosure;

FIG. 4 is a graphical illustration pressure response at an injector well in a subterranean geologic formation after shut-in of injection in a producer well in a method embodiment in accordance with the present disclosure;

FIG. 5 is a graphical illustration of a pressure inflection analysis on a subterranean geologic formation having a treatment well (producer or injector) and two adjacent wells (injector or producer) in a method embodiment in accordance with the present disclosure;

FIG. 6 is a graphical illustration of a time to first response—pressure inflection—analysis on a subterranean geologic formation having a treatment well (producer or injector) and two adjacent wells (injector or producer) in a method embodiment in accordance with the present disclosure;

FIG. 7 is a graphical illustration of a volume to first response—pressure inflection—analysis on a subterranean geologic formation having a treatment well (producer or injector) and two adjacent wells (injector or producer) in a method embodiment in accordance with the present disclosure;

FIG. 8 is a graphical illustration pressure response at two injector wells in a subterranean geologic formation after shut-in of injection in a producer well in a method embodiment in accordance with the present disclosure;

FIGS. 9-20 are logic diagrams illustrating eleven method embodiments in accordance with the present disclosure; and FIG. 21 is a schematic illustration of a system embodiment in accordance with the present disclosure.

It is to be noted, however, that the appended drawings are not to scale, and illustrate only typical process (method) and system embodiments of the present disclosure. Therefore, the drawing figures are not to be considered limiting in scope, for the disclosure may admit to other equally effective embodiments. Identical reference numerals are used throughout the several views for like or similar elements.

DETAILED DESCRIPTION

In the following description, numerous details are set forth to provide an understanding of the disclosed systems, combinations, and processes. However, it will be understood by those skilled in the art that the systems and processes disclosed herein may be practiced without these details and that numerous variations or modifications from the described embodiments may be possible. All technical articles, published and non-published patent applications, standards, patents, statutes and regulations referenced herein are hereby explicitly incorporated herein by reference, irrespective of the page, paragraph, or section in which they are referenced. Where a range of values describes a parameter, all sub-ranges, point values and endpoints within that range or defining a range are explicitly disclosed herein. All percentages herein are by weight unless otherwise noted. In the event definitions of terms in the referenced patents and applications conflict with how those terms are defined in the present application, the definitions for those terms that are provided in the present application shall be deemed controlling. Where a range of values describes a parameter, all sub-ranges, point values and endpoints within that range are explicitly disclosed herein. This document follows the well-established principle that the words "a" and "an" mean "one or more" unless we evince a clear intent to limit "a" or "an" to "one." For example, when we state "a pump", we mean that the specification supports a legal construction of "a pump" that encompasses structure distributed among multiple physical structures, and a legal construction of "a well" that encompasses structure distributed among multiple physical structures.

As mentioned herein, extraction of heat from Dry Hot Rock (DHR) and other geothermal formations presents several efficiency and power advantages over other EGS or CLGS approaches for geothermal energy recovery. To efficiently extract heat, horizontal wells are drilled within the resource. However, in order to efficiently extract heat, there is a requirement of horizontal well/vertical well deployment within the basement rock to maximize area of contact. In order for drilled horizontal wells to yield optimal contact area with the basement rock to enable sufficient energy intensity output on the surface, it would be helpful to know the quality of well connectivity between one or more injector wells and one or more producer wells prior to, during, and/or after stimulation treatment of one or more of these wells. As may be seen, current practices may not be adequate for all circumstances, and do not address the noted problems with respect to extracting heat from DHR. There remains a need for more robust systems and processes for assessing and/or diagnosing connectivity between injector and connector wells in general, and more specifically prior to, during, and/or after stimulation of injector and/or producer wells in EGS. The systems and processes of the present disclosure are directed to these needs.

As described in more detail herein with reference to the various drawing figures, processes and systems of the present disclosure address problems identified by the inventors herein, namely the lack of adequate processes and systems to assess and/or diagnose connectivity and/or permeability in subterranean geologic formations, in particular geothermal formations, prior to, during, and/or after stimulation. The inventors herein investigated and developed solutions to these problems.

Figure 1:
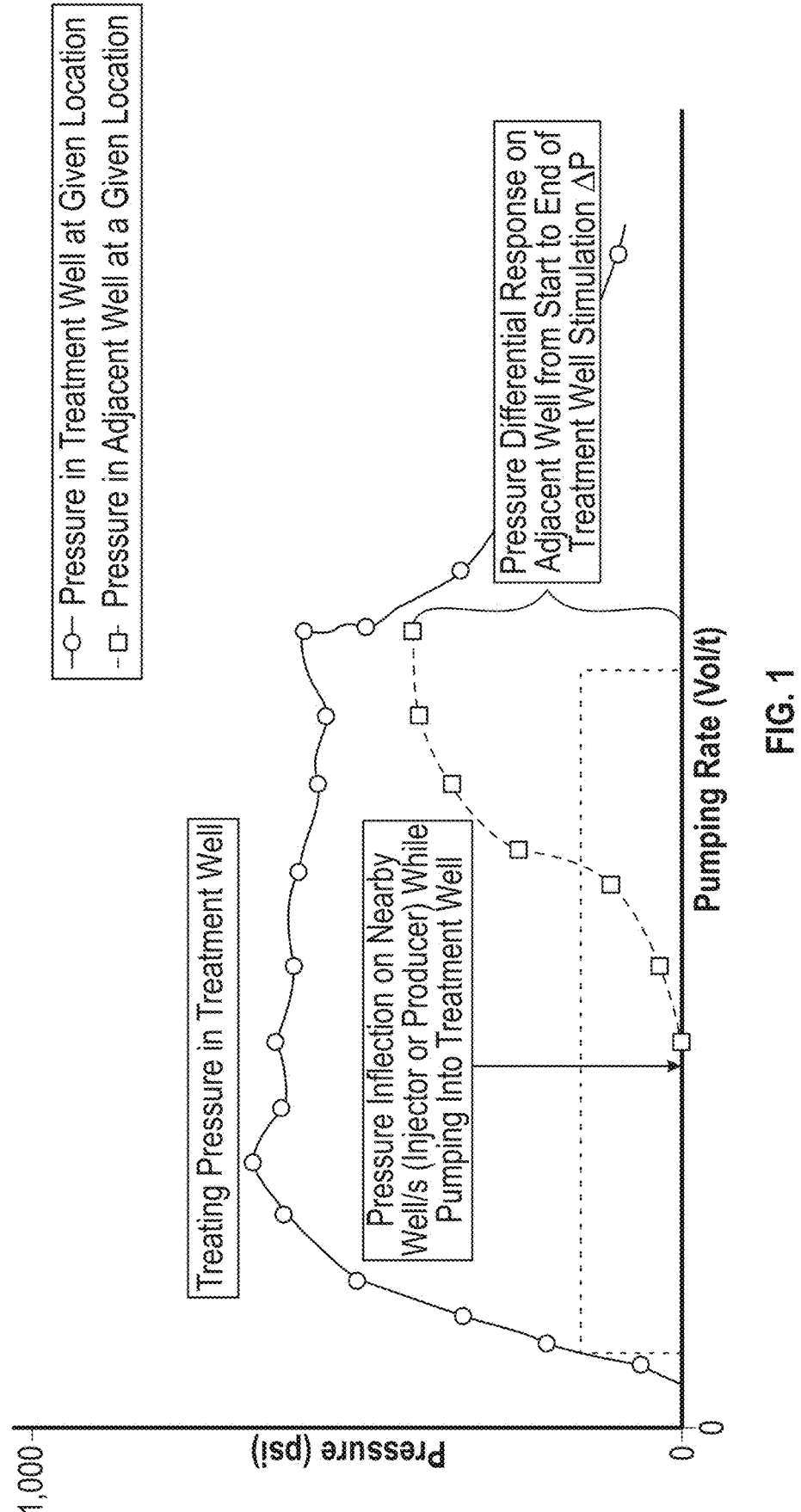

Turning now to the drawing figures, and with reference to FIG. 21, FIG. 1 is a graphical illustration of a pressure inflection analysis on a subterranean geologic formation 8 having a treatment well (producer well 4 or injector well 2) and an adjacent "observation" well (injector well 2 or producer wells 4, 6) in a method embodiment in accordance with the present disclosure. Injector well 2 and producer wells 4, 6 are components of a geothermal heat harvesting system and are connected to a power plant 10 by various conduits 5, 7, an injector pump 9, and fresh fluid make-up conduit 11, typically well (ground) water. Each of injector well 2 and producer wells 4, 6 include one or more pressure sensors 30 which include or are accompanied by wired or wireless transmission of signal capability to a sub-system 20. Sub-system 20 is located at the surface or at a remote location, and includes a timer 22 and hardware and software 24 configured to calculate and/or display various parameters, such as pressure at one the pressure sensors 30, differential pressure, pressure derivative, and/or pressure response at and post shut-in, as further explained herein. In the pressure inflection analysis illustrated graphically in FIG. 1, pressure at one or more pressure sensors 30 is plotted on the Y-axis against pumping rate of a test fluid on the X-axis. The upper curve represents treating pressure of test fluid in a treatment well (either a producer well or an injector well) at a sensor 30 and the lower curve represents pressure of test fluid at a sensor 30 on one of the other, adjacent observation wells (injector well or producer well).

FIG. 2 is a graphical illustration of a time to first response—pressure inflection—analysis on subterranean geologic formation 8 having a treatment well (producer well 4 or 6, or injector well 2) and an adjacent well (injector well 2 or producer well 4) in a method embodiment in accordance with the present disclosure. In the time to first response analysis illustrated graphically in FIG. 2, pressure of test fluid at one or more pressure sensors 30 is plotted on the Y-axis against time during pumping of a test fluid on the X-axis. The upper curve represents treating pressure of test fluid in a treatment well (either a producer well or an injector well) at a sensor 30 and the lower curve represents the time to a first response of test fluid at a sensor 30 on one of the other, adjacent wells (injector well or producer well). Also illustrated are variable pressure responses post shut-in of the treatment well.

FIG. 3 is a graphical illustration of a volume to first response-pressure inflection-analysis on a subterranean geologic formation having a treatment well (producer or injector) and an adjacent well (injector or producer) in a method embodiment in accordance with the present disclosure. In a volume to first response analysis, as illustrated graphically in FIG. 3, pressure of test fluid at one or more pressure sensors 30 is plotted on the Y-axis against volume of a test fluid on the X-axis. The upper curve represents treating pressure of test fluid in a treatment well (either a producer well or an injector well) at a sensor 30 and the lower curve represents pressure of test fluid at a sensor 30 on one of the other, adjacent wells (injector well or producer well). Also illustrated are volume of test fluid pumped (linearly increasing) and variable pressure responses post shut-in of the treatment well.

FIG. 4 is a graphical illustration pressure response at an injector well in a subterranean geologic formation after shut-in of injection of test fluid in a producer well in a method embodiment in accordance with the present disclosure. In a pressure response analysis, pressure response on injector well 2 at shut-in of injection at producer well 4 or 6 is analyzed, or vice versa. As illustrated graphically in FIG. 4, pressure of test fluid at one or more pressure sensors 30 is plotted on the Y-axis against test fluid pumping rate (volume/time) of the test fluid on the X-axis. The upper curve represents treating pressure of test fluid in a treatment well (either a producer well or an injector well) at a sensor 30 and the lower curve represents pressure of test fluid at a sensor 30 on one of the other, adjacent wells (injector well or producer well). Also illustrated are various pressure responses post shut-in of the treatment well.

FIGS. 5-8 correspond to FIGS. 1-4, but at two observation wells rather than one, illustrating different pressure inflections of test fluid for two different observation wells (FIG. 5), different times to first response for two different observation wells (FIG. 6), volume to first response at two different observation wells (FIG. 7), and pressure response at two observation wells at and post shut-in of injection in the treatment well (FIG. 8). It will be appreciated that the observation wells may or may not be "adjacent" the injector well or adjacent each other; furthermore, use of the word "adjacent" is merely a useful term; the wells need not be literally adjacent the treatment well, but in fact could be centimeters, meters or kilometers apart. The response is a diagnostic tool of rock fabric between the injection point and the response pressure point(s) specially the way the pressure behaves after shut-in of the test fluid. In case of multiple responses in the adjacent wells, the responses can be used to indicate the preferential direction of the flow path and/or the heterogeneity of the rock in the flow path and/or the complexity of the path itself.

FIGS. 9-20 are logic diagrams illustrating eleven method or process embodiments 500, 600, 700, 800, 900, 1000, 1100, 1200, 1300, 1400, and 1500 in accordance with the present disclosure. It should be noted that these are specific, non-limiting embodiments, and that certain other embodiments are contemplated, where for example volume observed at the one or more selected downhole locations could refer to a pore fluid rather than the test fluid, or a mixture of test fluid and ground fluids; and pressure response observed at the one or more selected downhole locations at and post shut-in of injection of the test fluid in the one or more producer wells could in certain embodiments refer to pressure response exhibited at the one or more selected downhole locations by a pore fluid rather than a test fluid, or mixture of test fluid and pore fluids. The inventors herein contemplate any of the following scenarios:

Inject fluid A (either water, gas, vapor, foam, or stimulation fluid) in a first well, observe arrival time, volume, and/or pressure attributes at a single or multiple observation wells or multiple observation wells for fluid A.

Inject fluid A (either water, gas, vapor, foam, or stimulation fluid) in a first well, observe arrival time, volume, and/or pressure attributes at a single or multiple observation wells for fluid B (previously applied fluid, displaced fracture or pore fluid).

Inject fluid A (either water, gas, vapor, foam, or stimulation fluid) in a first well, observe arrival time, volume, and/or pressure attributes at a single or multiple observation wells for mix of fluid A with fluid B (previously applied fluid, displaced fracture or pore fluid).

Referring specifically to FIG. 9, embodiment 500 is a process for assessing connectivity and/or permeability between injector and producer wells in a subterranean geologic formation comprising (box 502):

a) assessing connectivity between one or more injector wells and one or more producer wells and common contact rock area by pressure communication analytics, before, during or after injection of a stimulation fluid into the one or more producer wells (box 504);

b) (box 506) the pressure communication analytics comprising injecting a test fluid into the one or more producer wells and analysis of pressure inflection at one or more selected downhole locations in the one or more injector wells before, during or after pumping the stimulation fluid into the one or more producer wells and measuring one or more of:

i. time to a first pressure inflection of the test fluid at the one or more selected downhole locations;

ii. volume of the test fluid pumped during the time to the first pressure inflection at the one or more selected downhole locations;

iii. differential of pressure at the one or more selected downhole locations from moment of the first pressure inflection to end of injection of the test fluid in the one or more producer wells;

iv. pressure derivative at the one or more selected downhole locations during entire time of injection of the test fluid into the one or more producer wells; and v. pressure response at the one or more selected downhole locations at and post shut-in of injection of the test fluid in the one or more producer wells; and c) composing a connectivity matrix which classifies pressure communication observed during the measurements (box 508).

Referring specifically to FIG. 10, embodiment 600 is a process for enhancing connectivity and/or permeability between injector and producer wells in a subterranean geologic formation comprising (box 602):

a) assessing connectivity between one or more injector wells and one or more producer wells and common contact rock area by pressure communication analytics before, during or after injection of a stimulation fluid into the one or more producer wells (box 604);

b) the pressure communication analytics comprising injecting a test fluid into the one or more producer wells and analysis of pressure inflection at one or more selected downhole locations in the one or more injector wells, before, during or after pumping the stimulation fluid into the one or more producer wells and measuring time to a first pressure inflection of the test fluid at the one or more selected downhole locations (box 606); and c) composing a connectivity matrix which classifies pressure communication observed during the measuring time (box 608).

Referring specifically to FIG. 11, embodiment 700 is a process for enhancing connectivity and/or permeability between injector and producer wells in a subterranean geologic formation comprising (box 702):

a) assessing connectivity between one or more injector wells and one or more producer wells and common contact rock area by pressure communication analytics before, during or after injection of a stimulation fluid into the one or more producer wells (box 704);

b) the pressure communication analytics comprising injecting a test fluid into the one or more producer wells and analysis of pressure inflection at one or more selected downhole locations in the one or more injector wells before, during or after pumping the stimulation fluid into the one or more producer wells and measuring volume of the test fluid pumped during the time to the first pressure inflection of the test fluid at the one or more selected downhole locations (box 706); and c) composing a connectivity matrix which classifies pressure communication observed during the measuring of volume (box 708).

Referring specifically to FIG. 12, embodiment 800 is a process for enhancing connectivity and/or permeability between injector and producer wells in a subterranean geologic formation comprising (box 802):

a) assessing connectivity between one or more injector wells and one or more producer wells and common contact rock area by pressure communication analytics before, during or after injection of a stimulation fluid into the one or more producer wells (box 804);

b) the pressure communication analytics comprising injecting a test fluid into the one or more producer wells and analysis of pressure inflection at one or more selected downhole locations in the one or more injector wells before, during or after pumping the stimulation fluid into the one or more producer wells and measuring differential of pressure at the one or more selected downhole locations from moment of the first pressure inflection to end of injection of the test fluid in the one or more producer wells (box 806); and c) composing a connectivity matrix which classifies pressure communication observed during the measuring differential of pressure (box 808).

Referring specifically to FIG. 13, embodiment 900 is a process for enhancing connectivity and/or permeability between injector and producer wells in a subterranean geologic formation comprising (box 902):

a) assessing connectivity between one or more injector wells and one or more producer wells and common contact rock area by pressure communication analytics before, during, or after injection of a stimulation fluid into the one or more producer wells (box 904);

b) the pressure communication analytics comprising injecting a test fluid into the one or more producer wells and analysis of pressure inflection at one or more selected downhole locations in the one or more injector wells before, during or after pumping the stimulation fluid into the one or more producer wells and measuring pressure derivative at the one or more selected downhole locations during entire time of injection of the test fluid into the one or more producer wells (box 906); and c) composing a connectivity matrix which classifies pressure communication observed from the measuring pressure derivative (box 908).

Referring specifically to FIG. 14, embodiment 1000 is a process for enhancing connectivity and/or permeability between injector and producer wells in a subterranean geologic formation comprising (box 1002):

a) assessing connectivity between one or more injector wells and one or more producer wells and common contact rock area by pressure communication analytics before, during or after injection of a stimulation fluid into the one or more producer wells (box 1004);

b) the pressure communication analytics comprising injecting a test fluid into the one or more producer wells and analysis of pressure inflection at one or more selected downhole locations in the one or more injector wells before, during, or after pumping the stimulation fluid into the one or more producer wells and measuring pressure response at the one or more selected downhole locations at and post shut-in of injection of the test fluid in the one or more producer wells (box 1006); and c) composing a connectivity matrix which classifies pressure communication observed during the measuring pressure response (box 1008).

Referring specifically to FIG. 15, embodiment 1100 is a process for enhancing connectivity and/or permeability between injector and producer wells in a subterranean geologic formation comprising (box 1102):

a) assessing connectivity between one or more injector wells and one or more producer wells and common contact rock area by pressure communication analytics before, during or after injection of a stimulation fluid into the one or more injector wells (box 1104);

b) (box 1106) the pressure communication analytics comprising injecting a test fluid into the one or more injector wells and analysis of pressure inflection at one or more selected downhole locations in the one or more producer wells during or after pumping the test fluid into the one or more injector wells and measuring one or more of:

i. time to a first pressure inflection of the test fluid at the one or more selected downhole locations;

ii. volume of the test fluid pumped during the time to the first pressure inflection at the one or more selected downhole locations;

iii. differential of pressure at the one or more selected downhole locations from moment of the first pressure inflection to end of injection of the test fluid in the one or more injector wells;

iv. pressure derivative at the one or more selected downhole locations during entire time of injection of the test fluid into the one or more injector wells; and v. pressure response at the one or more selected downhole locations at and post shut-in of injection of the test fluid in the one or more injector wells; and c) composing a connectivity matrix which classifies pressure communication observed during the measurements (box 1108).

Referring specifically to FIG. 16, embodiment 1200 is a process for enhancing connectivity and/or permeability between injector and producer wells in a subterranean geologic formation comprising (box 1202):

a) assessing connectivity between one or more injector wells and one or more producer wells and common contact rock area by pressure communication analytics before, during or after injection of a stimulation fluid into the one or more injector wells (box 1204);

b) the pressure communication analytics comprising injecting a test fluid into the one or more injector wells and analysis of pressure inflection at one or more selected downhole locations in the one or more producer wells before, during, or after pumping the test fluid into the one or more injector wells and measuring time to a first pressure inflection of the test fluid at the one or more selected downhole locations (box 1206); and c) composing a connectivity matrix which classifies pressure communication observed during the measuring time (box 1208).

Referring specifically to FIG. 17, embodiment 1300 is a process for enhancing connectivity and/or permeability between injector and producer wells in a subterranean geologic formation comprising (box 1302):

a) assessing connectivity between one or more injector wells and one or more producer wells and common contact rock area by pressure communication analytics before, during or after injection of a stimulation fluid into the one or more injector wells (box 1304);

b) the pressure communication analytics comprising injecting a test fluid into the one or more injector wells and analysis of pressure inflection at one or more selected downhole locations in the one or more producer wells during or after pumping the test fluid into the one or more injector wells and measuring volume of the test fluid pumped during the time to the first pressure inflection of the test fluid at the one or more selected downhole locations (box 1306); and c) composing a connectivity matrix which classifies pressure communication observed during the measuring of volume (box 1308).

Referring specifically to FIG. 18, embodiment 1400 is a process for enhancing connectivity and/or permeability between injector and producer wells in a subterranean geologic formation comprising (box 1402):

a) assessing connectivity between one or more injector wells and one or more producer wells and common contact rock area by pressure communication analytics before, during, or after injection of a stimulation fluid into the one or more injector wells (box 1404);

b) the pressure communication analytics comprising injecting a test fluid into the one or more injector wells and analysis of pressure inflection at one or more selected downhole locations in the one or more producer wells before, during, or after pumping the stimulation fluid into the one or more injector wells and measuring differential of pressure at the one or more selected downhole locations from moment of the first pressure inflection of the test fluid to end of injection of the test fluid in the one or more injection wells (box 1406); and c) composing a connectivity matrix which classifies pressure communication observed during the measuring differential of pressure (box 1408).

Referring specifically to FIG. 19, embodiment 1500 is a process for enhancing connectivity and/or permeability between injector and producer wells in a subterranean geologic formation comprising (box 1502):

a) assessing connectivity between one or more injector wells and one or more producer wells and common contact rock area by pressure communication analytics before, during, or after injection of a stimulation fluid into the one or more injector wells (box 1504);

b) the pressure communication analytics comprising injecting a test fluid into the one or more injector wells and analysis of pressure inflection at one or more selected downhole locations in the one or more producer wells before, during, or after injecting the stimulation fluid into the one or more injector wells and measuring pressure derivative of the test fluid at the one or more selected downhole locations during entire time of injection of the test fluid into the one or more injector wells (box 1506); and c) composing a connectivity matrix which classifies pressure communication observed from the measuring pressure derivative (box 1508).

Referring specifically to FIG. 20, embodiment 1600 is a process for enhancing connectivity and/or permeability between injector and producer wells in a subterranean geologic formation comprising (box 1602):

a) assessing connectivity between one or more injector wells and one or more producer wells and common contact rock area by pressure communication analytics before, during, or after injection of a stimulation fluid into the one or more injector wells (box 1604);

b) the pressure communication analytics comprising injecting a test fluid into the one or more injector wells and analysis of pressure inflection at one or more selected downhole locations in the one or more producer wells before, during, or after injecting the stimulation fluid into the one or more injector wells and measuring pressure response at the one or more selected downhole locations at and post shut-in of injection of the test fluid in the one or more injector wells (box 1606); and c) composing a connectivity matrix which classifies pressure communication observed during the measuring pressure response (box 1608).

As referring to previously, FIG. 21 is a schematic illustration view of a subterranean geologic formation 8, an injector well 2 with perforations (not illustrated), and producer wells 4, 6 also having perforations not illustrated. Both injector and producer wells extend from the surface 1 into subterranean geologic formation 8. Existing natural fractures 40, sometimes referred to as "references", are illustrated as various lines in formation 8. Illustrated by arrows are the maximum horizontal stress ("Shmax"), the minimum horizontal stress ("Shmin"), and vertical stress ("Sv") in formation 8.

An injector well 2 (vertical, deviated or horizontal) is drilled. Attempts can be made to assess natural or previous fracture location, reach, number, volume, and other parameters using pressure techniques explained herein. One or more producer wells, 4, 6 is/are drilled towards the injector well's fracture network (vertical, deviated or horizontal). A fluid, typically water or other test (treatment) fluid, is pumped or otherwise injected into one or more producer wells 4, 6 and connectivity is analyzed at injector well 2 utilizing one or more of the time and/or pressure techniques of the various embodiments 500-1600. Alternatively, in some embodiments the injecting may be reversed. The pumping or injecting pressure may be less than, equal to, or more than a conventional stimulation, and may entail tensile or shear or pulsed stimulation coupled in a customized methodology as described in assignee's U.S. Pat. No. 12,247,470, but other fluid injection regimes may be employed, such as constant flow rate (volume/time), constantly increasing flow rate, sinusoidal or other cyclical flow rate, sinusoidal or other cyclical pressure, and combinations of these. Pump 9 would be on the surface, downhole, or combination of these. High pressure, high rate fracturing pumps are well-known and available from various commercial suppliers, including SLB, Halliburton, Baker Hughes, and others. The plume of treatment fluid from a producer well 4, 6 intersects with natural fractures 40, extending near injector well 2 (or vice versa, as the case may be).

The test/treatment fluid may or may not be the same or similar in composition to the stimulation fluid. Stimulation fluids may further include propping agents during any pumping stage, such as sand, bauxite particles, ceramic particles, petroleum coke particles, and the like, which tend to maintain fractures open. If pulsed stimulation flow is used, the pulse fracturing may employ an amplitude causing stress below Shmin, and frequency ranging from one pulse a second to one pulse every several minutes. The stimulation fluid pulses may be uniform or non-uniform in terms of pulse shape, amplitude, and frequency. Similarly, if pulsed test fluid flow is used, the pulse testing may employ an amplitude below Shmin, and frequency ranging from one pulse a second to one pulse every several minutes, and the pulses may be uniform or non-uniform in terms of pulse shape, amplitude, and frequency. Other embodiments may employ a long-duration, low volume hydro-shearing pumping session (of either the stimulation or test fluid) producing stress/pressure less than Shmin. This allows extensive traverse of fluid into the fracture network. The pumping may occur in stages, and can be customized to the reservoir conditions, rock type, depth, temperature, and stresses. The producer well(s) extend from the surface to the subterranean geologic formation, wherein the production well can be an open hole, or comprise a cemented or uncemented liner, or selectively segmented by ECP and sliding sleeves or pre-perforated liner. "ECP" refers to "embedded cylinder pipe", which is a type of concrete pressure pipe where a welded steel cylinder is embedded within a concrete core, then wrapped with high-tensile steel wire and coated with cement mortar.

Stimulation fluids may be water, brine, energizing fluids or polymer-based fluids. The wells may be constructed with tubing in place, or drill pipe, or coiled tubing. Jetting nozzles may be utilized for creating wellbore to rock fluid flow connections (connected paths). An angular abrasive material may be employed to achieve erosion and breakthrough the tubular materials separating jet nozzle tool and host rock. Dual injection in the tubing and annulus for generation of tensile fractures at desired depth may be accomplished using propping agents such as natural sands, bauxite, ceramic, and petroleum coke particles in sequences pertaining to a desired design.

While the stimulation methods and systems in assignee's previously granted U.S. Pat. No. 12,247,470 were intended to increase the fracture network by creating a thermal lattice in time, the methods and systems of the present disclosure seek to assess connectivity before, during, and/or after stimulation fluid treatments. For example, in the '470 patent certain embodiments include hydraulic pulsed stimulation at pre-set pulse intervals employed to weaken the rock fabric and allow for conductivity enhancement-GPS (geo pulse shearing). In the methods and systems of the present disclosure we are seeking to assess the quality and nature of the existing fractures before the methods of the '470 are utilized.

Operationally, for stimulation, the pump or pumps may operate at up to 20,000 psi pump pressure rating typical for land rigs; however, for test fluids, the least pressure required to observe a pressure deflection, pressure response derivative, or other parameter in accordance with the present disclosure is desired. While certain embodiments may include specialized equipment, such as high pressure pumps, coiled tubing rigs, and combinations thereof, standpipe pressure (SPP) above 3,000 psi is considered extreme. For the purposes of the present disclosure, any test fluid pressure above 0 psi gauge is considered a connection or a communication, which we classify as either a poroelastic communication, hydraulic communication, or direct hit.

Control devices may comprise a combination of: one or more pressure control devices, also referred to as chokes; one or more temperature control devices; one or more test fluid pumping devices; one or more flow measurement devices (also referred to herein as mass flow meters or mass flow sensors); and in certain embodiments one or more accessory equipment such as one or more connectors, one or more isolation valves, one or more pressure relief devices, among others. The specific configuration of the wells and test fluid and stimulation fluid sequences define the capabilities of each system and process embodiment. Redundancy of components may allow for extended service periods and mitigates risk of downtime due to component failure. An example would be a pressure control device (choke) plugging with well return solids, or washout due to erosion. In this case, isolating the failed component and enabling another one allows for continued operations, and enables evaluation and/or modification of the operational parameters to minimize the risk of failure of the new component in use.

A dedicated contingency pressure control device may be used to quickly react to sudden increases in pressure, potentially due to one or more operational pressure control devices plugging, or other reasons. This contingency pressure control device may be controlled by an automated system to open and regulate a maximum pressure set point providing time to enable additional flow paths to bypass the blocked component, if available, or to stop operations to correct the deviation.

One or more mass flow meters may enable monitoring the fluid flow rates, and aid in comparison of test fluid flow and density out of the injector or producer well against test fluid flow and density being pumped into the producer or injector well.

During a test and during stimulation, one or all of T, P, mass flow rate, gas or vapor concentrations (or percentages of set point values) inside and/or outside the tubing and in the annulus may be measured downhole and displayed locally on a Human Machine Interface (HMI), either in sub-system 20 (FIG. 21) or on another device, such as a laptop computer having display screen having a graphical user interface (GUI), or handheld device, or similar. In certain embodiments the HMI may record and/or transmit the data via wired or wireless communication to another HMI, such as a laptop computer, desktop computer, or hand-held computer or display. These communication links may be wired or wireless. It will be evident to those of skill in this art that the diagnostics of pressure measurements do not have to be limited to pressure transducers on surface only. Methods and systems of the present disclosure contemplate including one or more downhole gauges as diagnostic tools, as well as distributed acoustic sensing ("DAS") and/or distributed temperature sensing ("DTS") diagnostics using fiber optic cables. Pressure and/or temperature measurements downhole can be performed in real time in the injector well(s) and/or producer well(s) by running in hole wireline/slickline conveyed logging tools.

One or more measurement and control strategies may be employed. A pressure measurement and process control scheme may be employed, for example in conjunction with the pressure measurement devices 30 and mass flow controllers. A master controller may be employed, but the disclosure is not so limited, as any combination of controllers could be used. Programmable logic controllers (PLCs) may be used.

Injector wells, producer wells, pumps, connecting conduits, and other components described herein may be built to meet ISO standards, Det Norske Veritas (DNV) standards, American Bureau of Standards (ABS) standards, American Petroleum Institute (API) standards, and/or other standards.

In certain embodiments, internal algorithms in the logic device, such as a PLC, may calculate a rate of increase or decrease in pressure inside the tubing and/or annulus of a treatment well and/or an adjacent well. This may then be displayed or audioed in a series of ways such as "percentage to shutdown" lights or sounds, and the like on one or more GUIs. In certain embodiments, an additional function within a HMI may be to audibly alarm when an observed pressure or a calculated pressure rate of increase or decrease reaches a level set by the operator. In certain embodiments this alarm may be sounded at the well site, as well as remote from the well site, for example in a local control room, or remote control room.

What has not been recognized or realized are systems and processes for assessing nature and quality of connectivity and/or permeability in a subterranean geologic formation in real time using a test fluid, in particular in geothermal formations, prior to, during and/or after main stimulation of such formations. Systems and processes to accomplish this without significant risk to workers is highly desirable.

Thus the processes and systems described herein afford ways to perform assessing connectivity and/or permeability in a subterranean geologic formation efficiently, safely and economically, and in real time, with significantly reduced risk of injury and discomfort to site workers.

From the foregoing detailed description of specific embodiments, it should be apparent that patentable processes (methods) and systems have been described. Although specific embodiments of the disclosure have been described herein in some detail, this has been done solely for the purposes of describing various features and aspects of the systems and processes, and is not intended to be limiting with respect to their scope. It is contemplated that various substitutions, alterations, and/or modifications, including but not limited to those implementation variations which may have been suggested herein, may be made to the described embodiments without departing from the scope of the appended claims. For example, some processes and systems of this disclosure may be devoid of certain components and/or features: for example, use of test fluids devoid of proppants, or devoid of polymers; systems devoid of low-strength steels; systems devoid of threaded fittings; systems devoid of welded fittings; systems devoid of casing. Some pulsating fluid treating modes may employ pulses other than sinusoidal pulses, for example, but not limited to, step pulses.

What is claimed is:

1. A process for assessing connectivity and/or permeability between injector and producer wells in a subterranean geothermal formation comprising:

a) assessing connectivity between one or more injector wells and one or more producer wells and common contact rock area by pressure communication analytics before, during or after injection of a stimulation fluid into the one or more producer wells;

b) the pressure communication analytics comprising injecting a test fluid into the one or more producer wells and analysis of pressure inflection at one or more selected downhole locations before, during or after pumping a stimulation fluid into the one or more producer wells and measuring one or more of:

i. time to a first pressure inflection of the test fluid at the one or more selected downhole locations;

ii. volume of the test fluid pumped during the time to the first pressure inflection at the one or more selected downhole locations;

iii. differential of pressure at the one or more selected downhole locations from moment of the first pressure inflection to end of injection of the test fluid in the one or more producer wells;

iv. pressure derivative at the one or more selected downhole locations during entire time of injection of the test fluid into the one or more producer wells; and v. pressure response at the one or more selected downhole locations at and post shut-in of injection of the test fluid in the one or more producer wells;

wherein the injecting the test fluid into the one or more producer wells comprises injecting the test fluid in a long injection period as a hydro-shearing stage with a volume based on an estimated total porosity of natural fractures encountered in the subterranean geothermal formation estimated from a borehole logging tool or from geologic settings of the subterranean geothermal formation;

c) composing a connectivity matrix which classifies pressure communication observed during the measurements; and d) extracting heat from the subterranean geothermal formation using a working fluid after classifying the pressure communication observed during the measurements.

2. The process of claim 1, further comprising changing in real time one or more parameters of the stimulation fluid to form a second stimulation fluid, and/or changing a stimulation design, according to the classification of the pressure communication observed during the measurements and the connectivity matrix.

3. The process of claim 2, wherein the changing one or more parameters of the stimulation fluid and/or the changing the stimulation design comprises changing one or more of temperature, pressure, composition, density, viscosity, conductivity, tracer content, solids content, proppant percentage and/or proppant composition, and/or proppant electrical conductivity.

4. The process of claim 1, wherein the injecting of the test fluid into the one or more producer wells comprises injecting the test fluid at a rate and volume into the subterranean geothermal formation, generating a downhole pressure that forces the test fluid through existing fractures in the subterranean geothermal formation, with or without tensile fracturing.

5. The process of claim 1, wherein the injecting the test fluid into the one or more producer wells comprises injecting the test fluid into the one or more producer wells in a pulsating mode through existing natural fractures, the pulsing mode having a pulse amplitude below Shmin with frequency determined by rock fabric of the subterranean geothermal formation and bottom hole static temperature ("BHST").

6. A process for enhancing connectivity and/or permeability between injector and producer wells in a subterranean geothermal formation comprising:

a) assessing connectivity between one or more injector wells and one or more producer wells and common contact rock area by pressure communication analytics before, during or after injection of a stimulation fluid into the one or more producer wells;

b) the pressure communication analytics comprising injecting a test fluid into the one or more producer wells and analysis of pressure inflection at one or more selected downhole locations before, during or after pumping the stimulation fluid into the one or more producer wells and measuring time to a first pressure inflection of the test fluid at the one or more selected downhole locations, wherein the injecting the test fluid into the one or more producer wells comprises injecting the test fluid in a long injection period as a hydro-shearing stage with a volume based on an estimated total porosity of natural fractures encountered in the subterranean geothermal formation estimated from a borehole logging tool or from geologic settings of the subterranean geothermal formation;

c) composing a connectivity matrix which classifies pressure communication observed during the measuring time; and d) extracting heat from the subterranean geothermal formation using a working fluid after classifying the pressure communication observed during the measurements.

7. A process for enhancing connectivity and/or permeability between injector and producer wells in a subterranean geothermal formation comprising:

a) assessing connectivity between one or more injector wells and one or more producer wells and common contact rock area by pressure communication analytics before, during or after injection of a stimulation fluid into the one or more producer wells;

b) the pressure communication analytics comprising injecting a test fluid into the one or more producer wells and analysis of pressure inflection at one or more selected downhole locations before, during or after pumping the stimulation fluid into the one or more producer wells and measuring volume of test fluid pumped during the time to the first pressure inflection at the one or more selected downhole locations, wherein the injecting the test fluid into the one or more producer wells comprises injecting the test fluid in a long injection period as a hydro-shearing stage with a volume based on an estimated total porosity of natural fractures encountered in the subterranean geothermal formation estimated from a borehole logging tool or from geologic settings of the subterranean geothermal formation;

c) composing a connectivity matrix which classifies pressure communication observed during the measuring of volume; and d) extracting heat from the subterranean geothermal formation using a working fluid after classifying the pressure communication observed during the measurements.

8. A process for enhancing connectivity and/or permeability between injector and producer wells in a subterranean geothermal formation comprising:

a) assessing connectivity between one or more injector wells and one or more producer wells and common contact rock area by pressure communication analytics before, during or after injection of a stimulation fluid into the one or more producer wells;

b) the pressure communication analytics comprising injecting a test fluid into the one or more producer wells and analysis of pressure inflection at one or more selected downhole locations before, during or after pumping the stimulation fluid into the one or more producer wells and measuring differential of pressure of the test fluid at the one or more selected downhole locations from moment of the first pressure inflection to end of injection of the test fluid in the one or more producer wells, wherein the injecting the test fluid into the one or more producer wells comprises injecting the test fluid in a long injection period as a hydro-shearing stage with a volume based on an estimated total porosity of natural fractures encountered in the subterranean geothermal formation estimated from a borehole logging tool or from geologic settings of the subterranean geothermal formation;

c) composing a connectivity matrix which classifies pressure communication observed during the measuring differential of pressure; and d) extracting heat from the subterranean geothermal formation using a working fluid after classifying the pressure communication observed during the measurements.

9. A process for enhancing connectivity and/or permeability between injector and producer wells in a subterranean geothermal formation comprising:

a) assessing connectivity between one or more injector wells and one or more producer wells and common contact rock area by pressure communication analytics before, during or after injection of a stimulation fluid into the one or more producer wells;

b) the pressure communication analytics comprising injecting a test fluid into the one or more producer wells and analysis of pressure inflection at one or more selected downhole locations before, during or after pumping the stimulation fluid into the one or more producer wells and measuring pressure derivative at the one or more selected downhole locations during entire time of injection of the test fluid into the one or more producer wells, wherein the injecting the test fluid into the one or more producer wells comprises injecting the test fluid in a long injection period as a hydro-shearing stage with a volume based on an estimated total porosity of natural fractures encountered in the subterranean geothermal formation estimated from a borehole logging tool or from geologic settings of the subterranean geothermal formation; and c) composing a connectivity matrix which classifies pressure communication observed from the measuring pressure derivative; and d) extracting heat from the subterranean geothermal formation using a working fluid after classifying the pressure communication observed during the measurements.

10. A process for enhancing connectivity and/or permeability between injector and producer wells in a subterranean geothermal formation comprising:

a) assessing connectivity between one or more injector wells and one or more producer wells and common contact rock area by pressure communication analytics before, during or after injection of a stimulation fluid into the one or more producer wells;

b) the pressure communication analytics comprising injecting a test fluid into the one or more producer wells and analysis of pressure inflection at one or more selected downhole locations before, during or after pumping the stimulation fluid into the one or more producer wells and measuring pressure response at the one or more selected downhole locations at and post shut-in of injection of the test fluid in the one or more producer wells, wherein the injecting the test fluid into the one or more producer wells comprises injecting the test fluid in a long injection period as a hydro-shearing stage with a volume based on an estimated total porosity of natural fractures encountered in the subterranean geothermal formation estimated from a borehole logging tool or from geologic settings of the subterranean geothermal formation;

c) composing a connectivity matrix which classifies pressure communication observed during the measuring pressure response; and d) extracting heat from the subterranean geothermal formation using a working fluid after classifying the pressure communication observed during the measurements.

11. A system, comprising:

a) a borehole logging tool;

b) a stimulation fluid injection system selected from a pump and a compressor;

c) a sub-system for assessing connectivity between one or more injector wells and one or more producer wells and common contact rock area by pressure communication analytics before, during or after injection of a stimulation fluid into the one or more producer wells or the one or more injector wells by the stimulation fluid injection system in a long injection period as a hydro-shearing stage with a volume based on an estimated total porosity of natural fractures encountered in the subterranean geothermal formation estimated from the borehole logging tool;

c) the sub-system for assessing connectivity comprising one or more pressure sensors positioned at one or more selected downhole locations before, during, or after pumping the stimulation fluid into the one or more producer wells or the one or more injector wells, the one or more pressure sensors configured to measure one or more of:

i. a first pressure inflection of a test fluid at the one or more selected downhole locations;

ii. differential of pressure at the one or more selected downhole locations from moment of the first pressure inflection to end of injection of the test fluid in the one or more producer wells or the one or more injector wells;

iii. pressure derivative at the one or more selected downhole locations during entire time of injection of the test fluid into the one or more producer wells or the one or more injector wells; and iv. pressure response at the one or more selected downhole locations at and post shut-in of injection of the test fluid in the one or more producer wells or the one or more injector wells.

12. The system of claim 11, further comprising components for measuring time, flow rate, and total flow of the stimulation fluid in real time.

13. The system of claim 11, further comprising software and hardware configured to enter data into and display a connectivity matrix which classifies pressure communication observed during the measurements.

* * * * *